United States Patent
Ono et al.

(10) Patent No.: US 12,313,212 B2
(45) Date of Patent: May 27, 2025

(54) FIXING DEVICE, FIXING METHOD, AND COMMUNICATION DEVICE

(71) Applicant: NEC Platforms, Ltd., Kawasaki (JP)

(72) Inventors: Satoko Ono, Kanagawa (JP); Yasuhiro Kubota, Kanagawa (JP); Takeshi Ohashi, Tokyo (JP)

(73) Assignee: NEC Platforms, Ltd., Kawasaki (JP)

( * ) Notice: Subject to any disclaimer, the term of this patent is extended or adjusted under 35 U.S.C. 154(b) by 177 days.

(21) Appl. No.: 17/913,051

(22) PCT Filed: Mar. 9, 2021

(86) PCT No.: PCT/JP2021/009294
§ 371 (c)(1),
(2) Date: Sep. 20, 2022

(87) PCT Pub. No.: WO2021/199959
PCT Pub. Date: Oct. 7, 2021

(65) Prior Publication Data
US 2023/0213141 A1 Jul. 6, 2023

(30) Foreign Application Priority Data
Mar. 31, 2020 (JP) .................................. 2020-062061

(51) Int. Cl.
*F16M 11/10* (2006.01)
*H01Q 1/12* (2006.01)

(52) U.S. Cl.
CPC ............... *F16M 11/10* (2013.01); *H01Q 1/12* (2013.01); *F16M 2200/024* (2013.01)

(58) Field of Classification Search
CPC ........ F16M 11/10; F16M 11/06; F16M 11/38; F16M 2200/04
(Continued)

(56) References Cited

U.S. PATENT DOCUMENTS 7,147,191 B2 * 12/2006 Ichikawa ............... F16M 11/10
248/292.12
2001/0050327 A1 * 12/2001 Sweere ................. F16C 11/045
248/292.14
(Continued)

FOREIGN PATENT DOCUMENTS

JP 52-8361 Y2 2/1977
JP 2009-118597 A 5/2009
(Continued)

OTHER PUBLICATIONS

International Search Report of PCT/JP2021/009294 dated Jun. 1, 2021 [PCT/ISA/210].
Japanese Office Action of No. 2020-062061 dated Mar. 29, 2022.

*Primary Examiner* — Alfred J Wujciak
(74) *Attorney, Agent, or Firm* — Sughrue Mion, PLLC

(57) ABSTRACT

A fixing device capable of reducing a burden on an operator when adjusting an inclination of communication equipment is achieved. A fixing device includes: a first jig configured to fix communication equipment; a second jig configured to rotatably support the first jig about a rotation shaft; a ratchet mechanism configured to be capable of switching restraint or permission of rotation of the first jig in one direction with respect to the second jig due to weight of the communication equipment, and permit rotation of the first jig in another direction with respect to the second jig; and a biasing member configured to store biasing force when the first jig rotates in one direction with respect to the second jig due to weight of the communication equipment, and bias rotation of the first jig in another direction with respect to the second jig.

8 Claims, 22 Drawing Sheets

(58) Field of Classification Search
USPC ... 248/122.1, 125.2, 125.3, 125.9, 130, 133, 248/136, 139, 140, 142, 144, 371, 372.1, 248/393, 395, 397
See application file for complete search history.

(56) References Cited

U.S. PATENT DOCUMENTS

2013/0056603 A1* 3/2013 Chu ................. F16M 11/10
248/371
2021/0361085 A1* 11/2021 Zhu ................. F16M 11/10
2023/0063925 A1* 3/2023 Wynalda, Jr. ...... F16M 11/2064

FOREIGN PATENT DOCUMENTS

WO 2007/058210 A1 5/2007
WO 2016/185638 A1 11/2016

\* cited by examiner

FIXING DEVICE, FIXING METHOD, AND COMMUNICATION DEVICE

CROSS REFERENCE TO RELATED APPLICATIONS

This application is a National Stage of International Application No. PCT/JP2021/009294 filed on Mar. 9, 2021, claiming priority based on Japanese Patent Application No. 2020-062061 filed on Mar. 31, 2020.

TECHNICAL FIELD

The present disclosure relates to a fixing device, a fixing method, and a communication device.

BACKGROUND ART

A general communication device includes communication equipment such as an antenna, and a fixing device to which the communication equipment is fixed and to which a direction of the communication equipment can be adjusted according to a communication situation. For example, a fixing device of Patent Literature 1 includes a biasing member that biases communication equipment in a rotational direction in which the communication equipment stands up with respect to a housing, and an adjusting means for gradually adjusting an inclination of the communication equipment with respect to the housing.

CITATION LIST

Patent Literature

[Patent Literature 1] International Patent Publication No. WO2007/58210

SUMMARY OF INVENTION

Technical Problem

In the fixing device disclosed in Patent Literature 1, in order for the biasing member to store biasing force, it is necessary to rotate the communication equipment in a direction in which the biasing member stores the biasing force by force of an operator who adjusts an inclination of the communication equipment. For this reason, the fixing device disclosed in Patent Literature 1 has a problem that a burden on an operator when adjusting the inclination of the communication equipment is large.

One of objects to be achieved by example embodiments disclosed in the present description is to provide a fixing device, a fixing method, and a communication device that contribute to solving the problem. Note that, this object is merely one of a plurality of the objects that a plurality of example embodiments disclosed in the present description intend to achieve. Other objects or problems and novel features become apparent from description of the present description or accompanying drawings.

Solution to Problem

A fixing device according to a first aspect includes:
a first jig configured to fix communication equipment;
a second jig configured to rotatably support the first jig about a rotation shaft;
a ratchet mechanism configured to be capable of switching restraint or permission of rotation of the first jig in one direction with respect to the second jig, which the first jig intends to rotate with respect to the second jig due to weight of the communication equipment, and permit rotation of the first jig in another direction with respect to the second jig; and
a first biasing member configured to store biasing force when the first jig rotates in the one direction with respect to the second jig due to weight of the communication equipment, and bias rotation of the first jig in another direction with respect to the second jig.

A fixing device according to a second aspect includes:
a first jig configured to fix communication equipment;
a second jig configured to rotatably support the first jig about a rotation shaft; and
a fixing unit configured to fix a rotation angle of the first jig with respect to the second jig, wherein
the fixing unit includes
a plurality of first through holes being formed on one of the first jig and the second jig on a circular arc having a first radius centered on the rotation shaft,
a plurality of second through holes being formed on the other of the first jig and the second jig on a circular arc having the first radius centered on the rotation shaft, and
a fastener being passed through each of the first through holes and each of the second through holes, and
the first jig can be fixed at each preset angle with respect to the second jig by a combination of a first through hole being selected from among the plurality of first through holes and a second through hole being selected from among the plurality of second through holes.

A communication device according to a third aspect includes:
the above-described fixing device; and
communication equipment configured to be fixed to the fixing device.

A fixing method according to a fourth aspect includes:
a process of, between a first jig to which communication equipment is fixed and a second jig to be rotatably connected with the first jig via a rotation shaft, in a state where a ratchet mechanism being capable of switching restraint or permission of rotation of the first jig in one direction with respect to the second jig, which the first jig intends to rotate with respect to the second jig due to weight of the communication equipment, and permitting rotation of the first jig in another direction with respect to the second jig is interposed, permitting rotation of the first jig in the one direction with respect to the second jig by the ratchet mechanism, also rotating the first jig in the one direction with respect to the second jig due to weight of the communication equipment, and storing biasing force of a biasing member being connected to the first jig and the second jig; and
a process of restraining rotation of the first jig in the one direction with respect to the second jig by the ratchet mechanism, also biasing rotation of the first jig in the another direction with respect to the second jig by the biasing member, and rotating the first jig in the another direction with respect to the second jig.

Advantageous Effects of Invention

According to the above-described aspects, it is possible to achieve a fixing device, a fixing method, and a communication device that are capable of reducing a burden on an operator when adjusting an inclination of communication equipment.

EXAMPLE EMBODIMENT

Hereinafter, the best example embodiment for achieving the present disclosure will be described with reference to the accompanying drawings. However, the present disclosure is not limited to the following example embodiments. In addition, in order to clarify the description, the following description and the drawings are appropriately simplified.

First Example Embodiment

Figure 1:
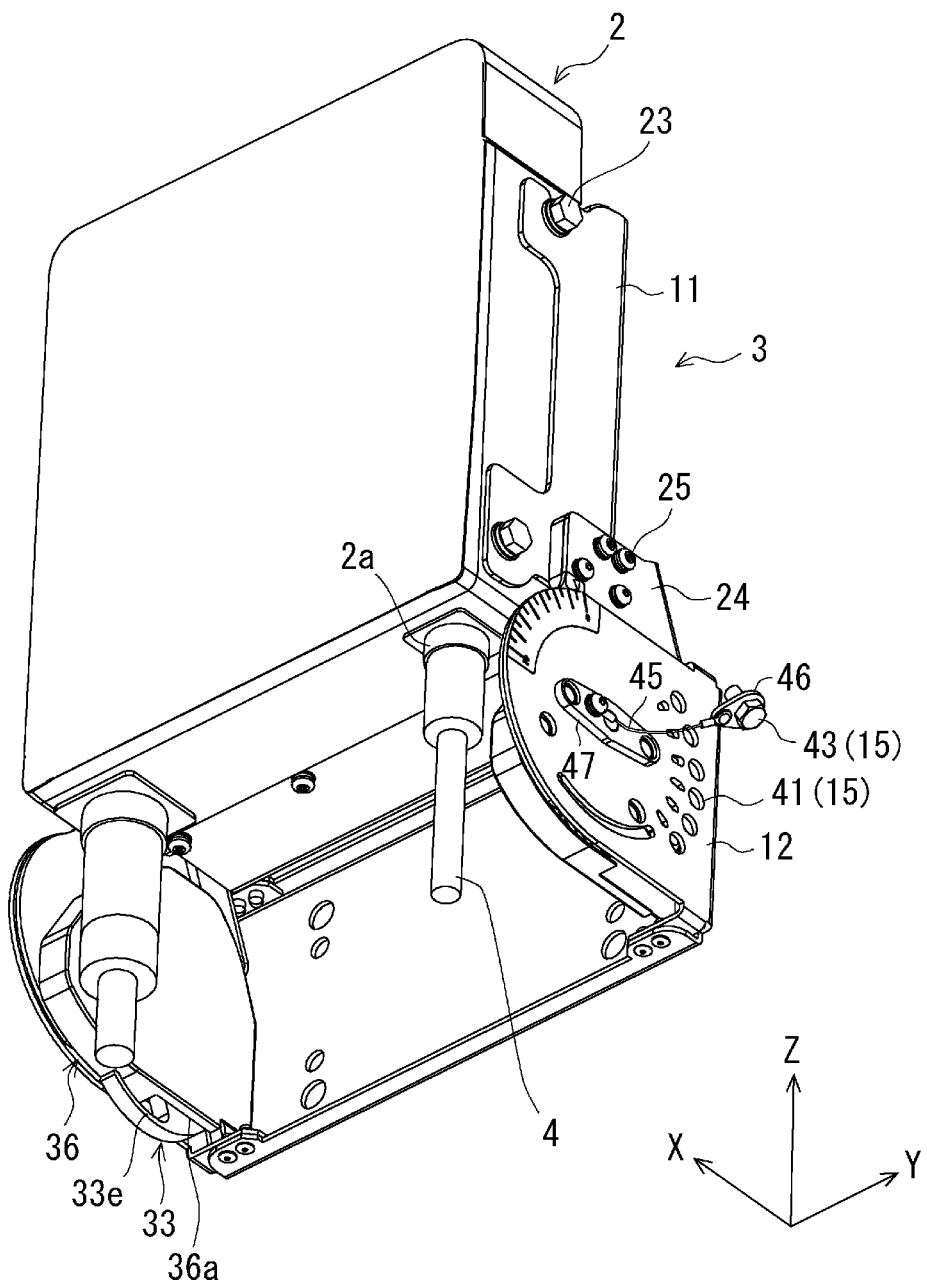
FIG. 1 is a perspective view illustrating a communication device according to a first example embodiment.

First, a configuration of a communication device using a fixing device according to the present example embodiment will be described. FIG. 1 is a perspective view illustrating the communication device according to the present example embodiment. Note that, in the following description, a three-dimensional (XYZ) coordinate system is used in order to clarify the description. Herein, a Z-axis minus side is a direction of gravity.

As illustrated in FIG. 1, a communication device 1 includes communication equipment 2 and a fixing device 3. The communication equipment 2 is, for example, an antenna integrated-type base station of a fifth generation mobile communication system (5G), and has weight of about 7 kg. The communication equipment 2 has a rectangular box shape having a longitudinal dimension (in FIG. 1, a dimension in a Z-axis direction) longer than a lateral dimension (in FIG. 1, a dimension in a Y-axis direction), and includes a connector 2a to which a wiring 4 is electrically connected to a side surface on a short side of the communication equipment 2. However, the communication equipment 2 may be an antenna or the like which is generally used for communication.

Figure 2:
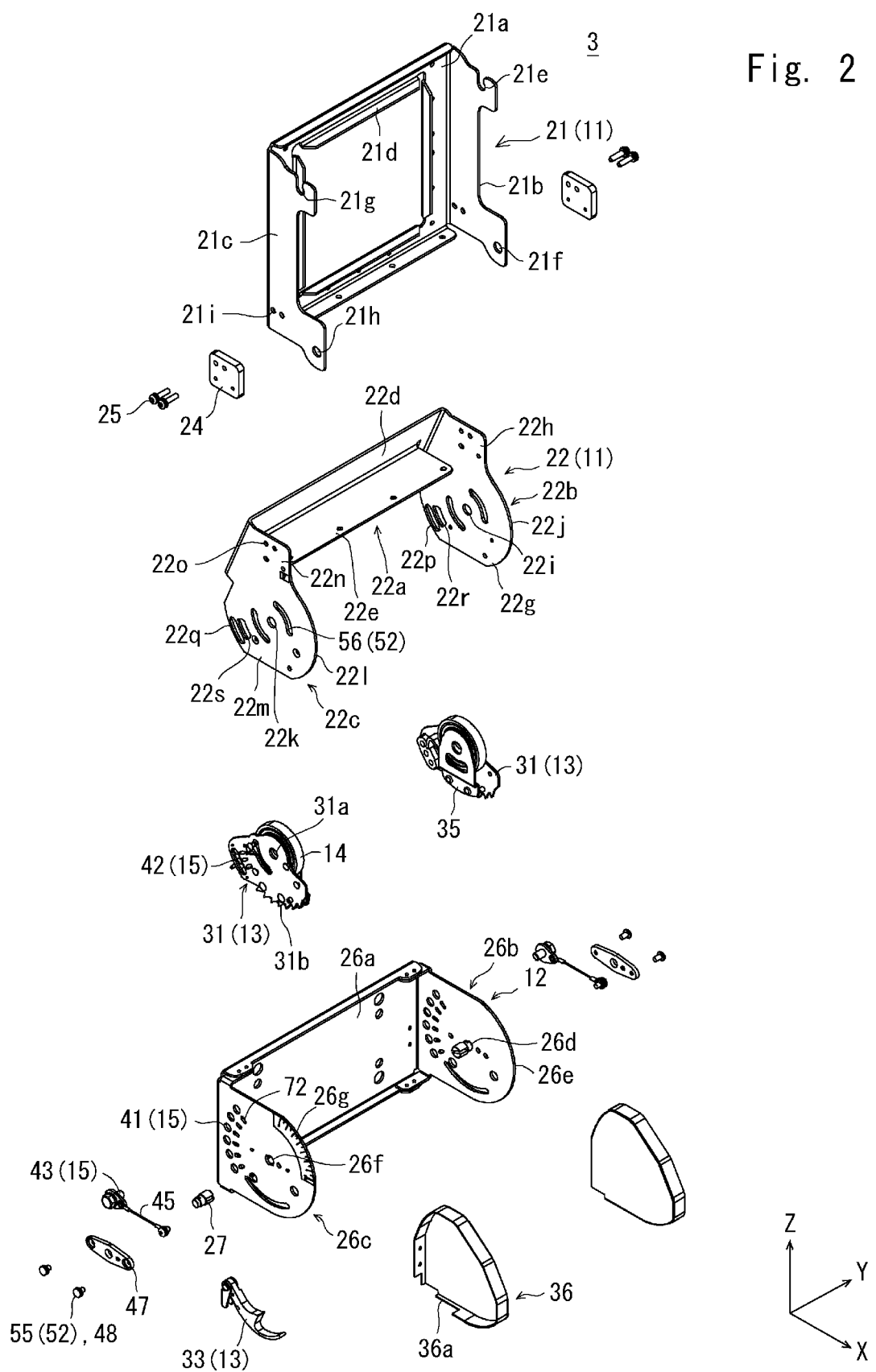
FIG. 2 is an exploded view illustrating a fixing device according to the first example embodiment.

The fixing device 3 is configured to be capable of adjusting an angle of the communication equipment 2, and is used, for example, to fix the communication equipment 2 to a body or the like. FIG. 2 is an exploded view illustrating the fixing device according to the present example embodiment. As illustrated in FIG. 2, the fixing device 3 includes a first jig 11, a second jig 12, a ratchet mechanism 13, a biasing member (first biasing member) 14, and a fixing unit 15. Herein, the following description of the fixing device 3 will be made with reference to a state illustrated in FIG. 2.

The communication equipment 2 is fixed to the first jig 11. The first jig 11 includes a bracket 21 and an arm 22. The bracket 21 has, for example, a substantially U-shape as a basic shape when viewed from the Z-axis direction, and includes a main surface portion 21a, a first side wall portion 21b, and a second side wall portion 21c. The main surface portion 21a has a plate shape substantially parallel to a YZ plane as a basic shape, and has a substantially rectangular shape when viewed from an X-axis direction. Then, an opening 21d penetrating the main surface portion 21a in the X-axis direction is formed substantially at the center of the main surface portion 21a.

The first side wall portion 21b protrudes from an end portion of the main surface portion 21a on a Y-axis plus side toward an X-axis plus side. Then, the first side wall portion 21b has a plate shape substantially parallel to an XZ plane as a basic shape, and has a substantially C-shape when viewed from the Y-axis direction. In an end portion of the first side wall portion 21b on a Z-axis plus side, a groove portion 21e extending in the Z-axis direction and having an open end portion on the Z-axis plus side is formed, and a through hole 21f is formed in a portion of the first side wall portion 21b on the Z-axis minus side.

The second side wall portion 21c has substantially the same shape as the first side wall portion 21b when viewed from the Y-axis direction, and therefore, although an overlapping description is omitted, a groove portion 21g and a through hole 21h are formed. As illustrated in FIG. 1, the communication equipment 2 is fixed to the bracket 21 by passing a bolt 23 through such a portion as the groove portion 21e and the through hole 21f of the first side wall 21b, and the groove portion 21g and the through hole 21h of the second side wall 21c, and further screwing the bolt 23 into a bolt hole formed in the side surface on a long side of the communication equipment 2.

The arm 22 includes a placing portion 22a, a first side wall portion 22b, and a second side wall portion 22c. The placing portion 22a includes a first portion 22d and a second portion 22e. The first portion 22d has a plate shape substantially parallel to the YZ plane as a basic shape. Then, the first portion 22d has a substantially inverted U-shape when viewed from the X-axis direction, and a notched portion 22f (see FIG. 3) is formed in an end portion of the first portion 22d on the Z-axis minus side.

The second portion 22e has a plate shape substantially parallel to an XY plane as a basic shape, and protrudes from an end portion of the notched portion 22f of the first portion 22d on the Z-axis plus side toward the X-axis plus side. The second portion 22e is formed, for example, by bending a part of the first portion 22d. When the communication equipment 2 is fixed to the bracket 21, an end portion of the communication equipment 2 on the Z-axis minus side is placed on the second portion 22e.

The first side wall portion 22b has a plate shape substantially parallel to the XZ plane as a basic shape, and protrudes from the end portion of the first portion 22d of the placing portion 22a on the Y-axis plus side toward the X-axis plus side. Then, the first side wall portion 22b has a substantially b-shape when viewed from the Y-axis direction, and includes a first portion 22g and a second portion 22h.

A through hole 22i through which a rotation shaft 27 passes is formed in the first portion 22g, and a circular arc portion 22j having a first radius centered on the through hole 22i is formed at an end portion of the first portion 22g on the X-axis plus side. The second portion 22h protrudes from the first portion 22g toward the Z-axis plus side, and has a substantially rectangular shape when viewed from the Y-axis direction. Such a portion of the first side wall portion 22b on the Z-axis plus side is fixed to the end portion of the first portion 22d of the placing portion 22a on the Y-axis plus side.

The second side wall portion 22c has substantially the same shape as the first side wall portion 22b when viewed from the Y-axis direction, and therefore, although an overlapping description is omitted, the second side wall portion 22c includes a first portion 22m in which a through hole 22k and a circular arc portion 22l are formed, and a second portion 22n. Such a portion of the second side wall portion 22c on the Z-axis plus side is fixed to the end portion of the first portion 22d of the placing portion 22a on the Y-axis minus side.

As illustrated in FIG. 2, the bracket 21 and the arm 22 are connected by screwing a bolt 25, through a connecting member 24, to a bolt hole 21i formed in the bracket 21 and a bolt hole 22o formed in the arm 22.

Thus, since a bracket is configured to be exchangeable with respect to the arm 22, arrangement, model, and the like of the communication equipment 2 can be easily changed by exchanging the bracket, as will be described later. However, a connecting means between the bracket 21 and the arm 22 is not limited to the above, and may be connected by welding or the like. In addition, the bracket 21 and the arm 22 may be integrally formed.

The second jig 12 includes a fixed portion 26a, a first side wall portion 26b, and a second side wall portion 26c. The fixed portion 26a is fixed to, for example, a body or the like. The fixed portion 26a has a plate shape substantially parallel to the YZ plane as a basic shape, and has a substantially rectangular shape when viewed from the X-axis direction. The first side wall portion 26b protrudes from an end portion of the fixed portion 26a on the Y-axis plus side toward the X-axis plus side, and has a plate shape substantially parallel to the XZ plane as a basic shape.

A through hole 26d through which the rotation shaft 27 passes is formed in the first side wall portion 26b, and a circular arc portion 26e having a first radius centered on the through hole 26d is formed at an end portion of the first side wall portion 26b on the X-axis plus side. The second side wall portion 26c has substantially the same shape as the first side wall portion 26b when viewed from the Y-axis direction, and therefore, although an overlapping description is omitted, a through hole 26f and a circular arc portion 26g are formed.

The arm 22 of the first jig 11 is arranged inside the second jig 12 described above, and the rotation shaft 27 passes through each of the through hole 26d of the first side wall portion 26b in the second jig 12 and the through hole 22i of the first side wall portion 22b in the first jig 11, and the through hole 26f of the second side wall portion 26c in the second jig 12 and the through hole 22k of the second side wall portion 22c in the first jig 11.

Thus, the first jig 11 and the second jig 12 are connected to each other in such a way as to be rotatable about the Y-axis relative to each other.

Incidentally, the rotation shaft 27 is fixed to the second jig 12 in such a way as not to rotate with respect to the second jig 12.

At this time, when viewed from the Y-axis direction, the second portion 22h of the first side wall portion 22b in the first jig 11 protrudes from the first side wall portion 26b of the second jig 12, and the second portion 22n of the second side wall portion 22c in the first jig 11 protrudes from the second side wall portion 26c of the second jig 12.

Then, when viewed from the Y-axis direction, the circular arc portion 22j of the first side wall portion 22b in the first jig 11 and the circular arc portion 26e of the first side wall portion 26b in the second jig 12 are arranged in such a way as to substantially overlap, and the circular arc portion 22l of the second side wall portion 22c in the first jig 11 and the circular arc portion 26g of the second side wall portion 26c in the second jig 12 are arranged in such a way as to substantially overlap. Thus, the fixing device 3 is configured in such a way that the communication equipment 2 does not interfere with the second jig 12 when the first jig 11 rotates about the rotation shaft 27 with respect to the second jig 12.

Figure 3:
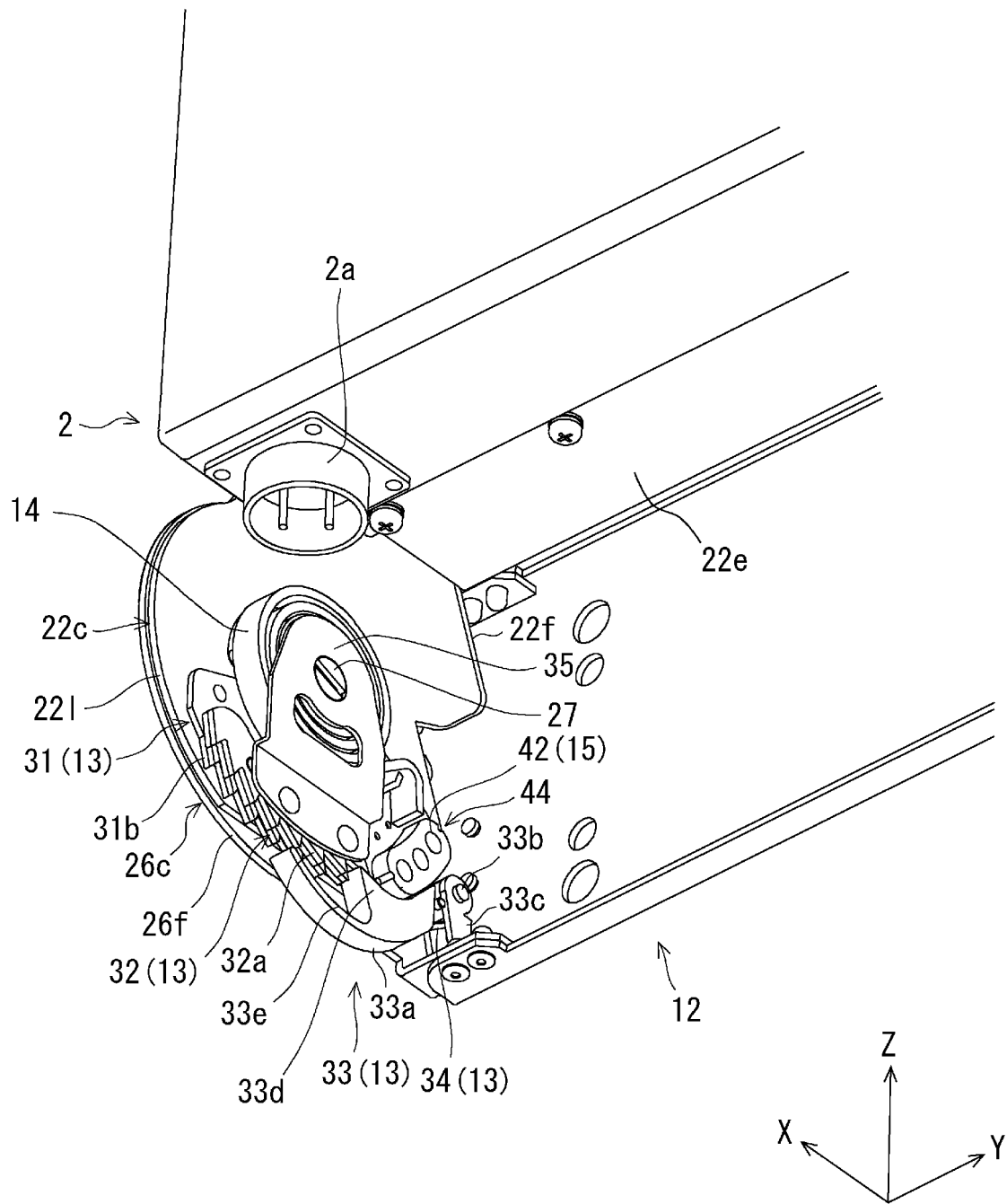
FIG. 3 is a perspective view illustrating a ratchet mechanism according to the first example embodiment.
Figure 4:
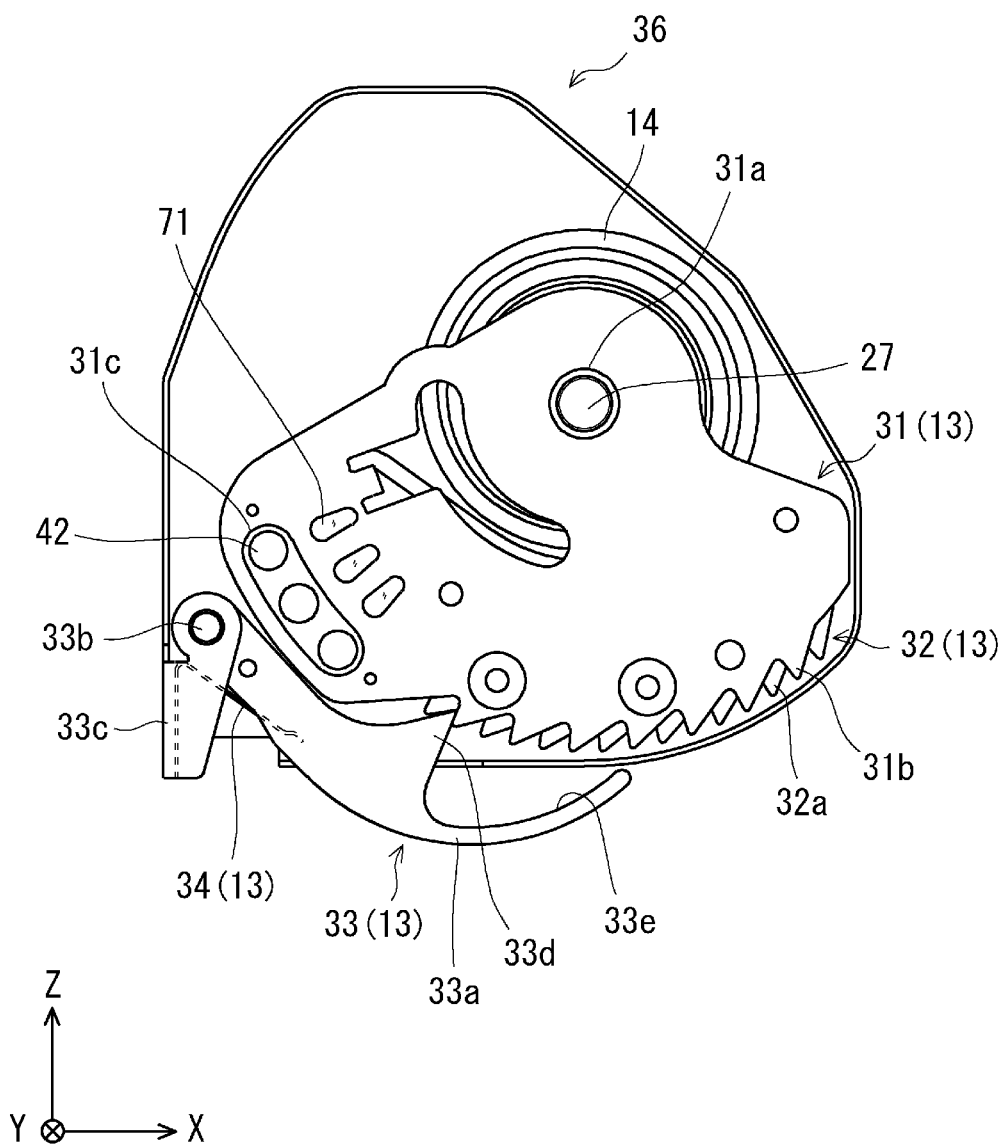
FIG. 4 is a diagram illustrating a periphery of the ratchet mechanism by extraction according to the first example embodiment.

The ratchet mechanism 13 connects the first jig 11 and the second jig 12. FIG. 3 is a perspective view illustrating a ratchet mechanism according to the present example embodiment. FIG. 4 is a diagram illustrating a periphery of the ratchet mechanism by extraction according to the present example embodiment. As illustrated in FIGS. 3 and 4, the ratchet mechanism 13 includes a first ratchet tooth 31, a second ratchet tooth 32, a lever pawl 33, and a biasing member (second biasing member) 34.

The first ratchet tooth 31 has a plate shape substantially parallel to the XZ plane, and a through hole 31a through which the rotation shaft 27 passes is formed. Then, in an outer peripheral portion of the first ratchet tooth 31, a tooth portion 31b is formed along a circular arc having a first radius centered on the through hole 31a, that is, the rotation shaft 27.

The tooth portion 31*b* is arranged at a preset first pitch (e.g., 10°), and has a shape being inclined in a counterclockwise direction when viewed from the Y-axis plus side. In other words, the tooth portion 31*b* has a shape being capable of permitting clockwise rotation of the first ratchet tooth 31 centered on the rotation shaft 27 as viewed from the Y-axis plus side and capable of restraining counterclockwise rotation.

The first ratchet tooth 31 described above is fixed to an inner surface of the first side wall portion 21*b* or the second side wall portion 21*c* in such a way that the tooth portion 31*b* of the first ratchet tooth 31 is along the circular arc portion 22*j* of the first side wall portion 21*b* or the circular arc portion 22*l* of the second side wall portion 21*c* of the first jig 11, in a state where the rotation shaft 27 is passed through the through hole 31*a*.

The second ratchet tooth 32 has a plate shape substantially parallel to the XZ plane, and is fixed to an inner surface of the first ratchet tooth 31. Then, in an outer peripheral portion of the second ratchet tooth 32, a tooth portion 32*a* is formed along a circular arc having a first radius centered on the rotation shaft 27.

The tooth portion 32*a* has substantially the same shape as the tooth portion 31*b* of the first ratchet tooth 31, and is provided at a preset first pitch. In other words, the tooth portion 32*a* has a shape being inclined in the counterclockwise direction when viewed from the Y-axis plus side, and capable of permitting clockwise rotation of the second ratchet tooth 32 centered on the rotation shaft 27, and capable of restraining counterclockwise rotation.

The tooth portion 32*a* of the second ratchet tooth 32 described above is arranged at shifting a preset phase (e.g., 5°) with respect to the tooth portion 31*b* of the first ratchet tooth 31. Therefore, the tooth portion 31*b* of the first ratchet tooth 31 and the tooth portion 32*a* of the second ratchet tooth 32 are alternately arranged when viewed from the Y-axis direction.

The lever pawl 33 includes a lever main body 33*a*, a rotation shaft 33*b*, and a fixing jig 33*c*. The lever main body 33*a* includes a pawl portion 33*d* to be engaged with the tooth portion 31*b* of the first ratchet tooth 31 or the tooth portion 32*a* of the second ratchet tooth 32, and is connected to the fixing jig 33*c* in such a way as to be rotatable about the rotation shaft 33*b* extending in the Y-axis direction. The fixing jig 33*c* is fixed to the second jig 12.

Thus, when the lever main body 33*a* is rotated in a direction approaching the first ratchet tooth 31 and the second ratchet tooth 32, the pawl portion 33*d* of the lever main body 33*a* is in a state of engaging with the tooth portion 31*b* of the first ratchet tooth 31 or the tooth portion 32*a* of the second ratchet tooth 32.

On the other hand, when the lever main body 33*a* is rotated in a direction away from the first ratchet tooth 31 and the second ratchet tooth 32, the pawl portion 33*d* of the lever main body 33*a* is in a state of not engaging with the tooth portion 31*b* of the first ratchet tooth 31 and the tooth portion 32*a* of the second ratchet tooth 32.

Herein, the lever pawl 33 may be provided with a knob portion 33*e* which is picked by an operator when the operator rotates the lever main body 33*a* in the direction away from the first ratchet tooth 31 and the second ratchet tooth 32.

The biasing member 34 biases the lever main body 33*a* toward a direction approaching the first ratchet tooth 31 and the second ratchet tooth 32. The biasing member 34 can be configured by, for example, a torsion spring, a bending spring, or the like. At this time, one end portion of the biasing member 34 is fixed to the lever main body 33*a*, and the other end portion of the biasing member 34 is fixed to the fixing jig 33*c*.

As described above, the first ratchet tooth 31 and the second ratchet tooth 32 are fixed to the first jig 11, and the lever pawl 33 is fixed to the second jig 12, and thereby, the ratchet mechanism 13 is arranged between the first jig 11 and the second jig 12.

When the first jig 11 rotates counterclockwise with respect to the second jig 12 as viewed from the Y-axis plus side, the biasing member 14 stores biasing force, and biases rotation of the first jig 11 to clockwise with respect to the second jig 12. The biasing member 14 may be configure by, for example, a spiral spring. Then, the biasing member 14 is arranged inside the fixing device 3 with respect to the first ratchet tooth 31, one end portion of the biasing member 14 is fixed to the rotation shaft 27, and the other end portion of the biasing member 14 is fixed to the first ratchet tooth 31.

Herein, the biasing member 14 is preferably sandwiched between a holding plate 35 and the first ratchet tooth 31 in such a way as not to be twisted in the Y-axis direction when the biasing member 14 is twisted. The holding plate 35 is, for example, a plate body being bent in a staircase shape, and covers a part of the biasing member 14 in a state of being fixed to the second ratchet tooth 32. However, the holding plate 35 may be configured in such a way as to be capable of sandwiching the biasing member 14 in the Y-axis direction with any member.

As illustrated in FIG. 1, the ratchet mechanism 13 and the biasing member 14 may be covered with a cover 36. At this time, it is preferable that an opening 36*a* is formed in a portion of the cover 36 on the Z-axis minus side, and the knob portion 33*e* of the lever pawl 33 is exposed from the opening 36*a*. Thus, an operator can easily operate the lever main body 33*a* via the knob portion 33*e* of the lever pawl 33.

Figure 5:
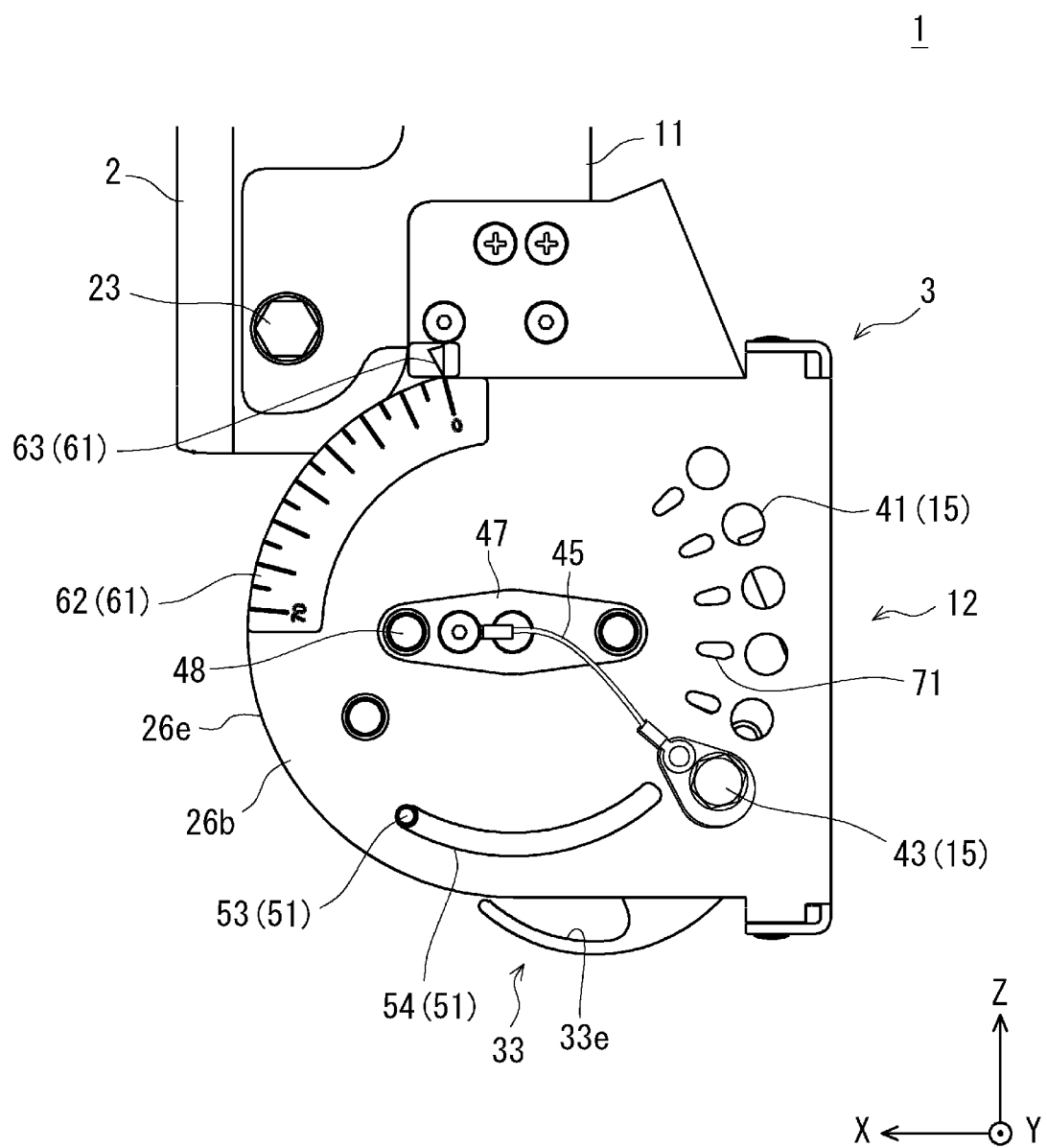
FIG. 5 is a side view illustrating a state where a bolt is passed through a first through hole and a second through hole.
Figure 6:
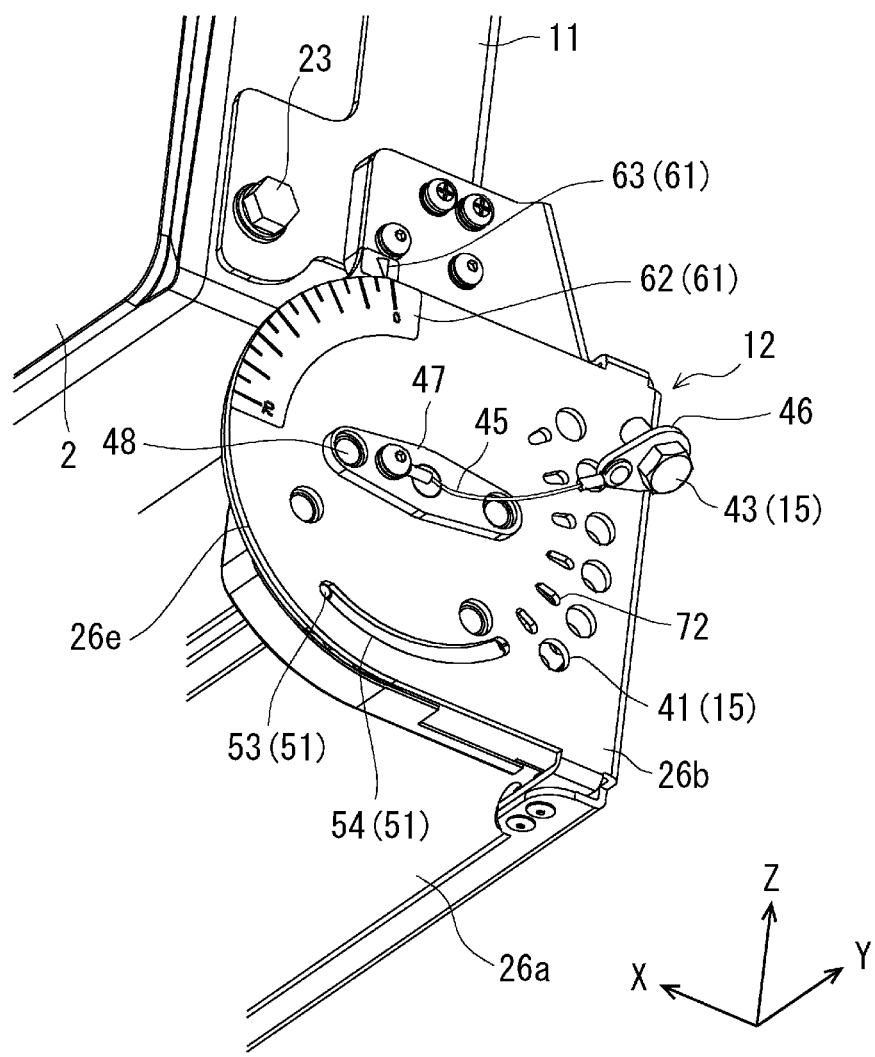
FIG. 6 is a perspective view illustrating a state where the bolt is removed from the first through hole and the second through hole.

The fixing unit 15 includes a first through hole 41, a second through hole 42, and a bolt 43. Herein, FIG. 5 is a side view illustrating a state where a bolt is passed through a first through hole and a second through hole. FIG. 6 is a perspective view illustrating a state where the bolt is removed from the first through hole and the second through hole.

As illustrated in FIGS. 5 and 6, the first through hole 41 is formed in the first side wall portion 26*b* and the second side wall portion 26*c* of the second jig 12. Then, a plurality of (e.g., six) the first through holes 41 are arranged on a circular arc having a second radius centered on the through hole 26*d* of the first side wall portion 26*b* or the through hole 26*f* of the second side wall portion 26*c*. However, the number of the first through holes 41 is not limited.

As illustrated in FIGS. 3 and 4, the second through hole 42 is a bolt hole formed in a plate nut 44. The plate nut 44 is fixed to the inner surface of the first ratchet tooth 31, and the second through hole 42 is formed in such a way as to penetrate the plate nut 44 in the Y-axis direction. A plurality of (e.g., three) the second through holes 42 are arranged on a circular arc having a second radius centered on the through hole 31*a* of the first ratchet tooth 31.

The second through hole 42 described above is arranged in such a way as to substantially overlap, when viewed from outside of the fixing device 3, an opening 31*c* formed in the first ratchet tooth 31 and an opening 22*p* formed in the first side wall portion 22*b* of the first jig 11, and the opening 31*c* formed in the first ratchet tooth 31 and an opening 22*q* formed in the second side wall portion 22*c* of the first jig 11.

However, the number of the second through holes 42 and the like are not limited. In addition, the second through hole 42 may be formed in the first side wall portion 22b and the second side wall portion 22c of the first jig 11, or may be formed in the first ratchet tooth 31.

As illustrated in FIG. 5, the bolt 43 passes through a first through hole 41 selected from the plurality of first through holes 41 and a second through hole 42 selected from the plurality of second through holes 42, and is screwed into the second through hole 42. At this time, although details will be described later, the first jig 11 can be fixed with respect to the second jig 12 at each preset angle (e.g., 5°) by a combination of the first through hole 41 and the second through hole 42.

In other words, when the tooth portion 31b of the first ratchet tooth 31 or the tooth portion 32a of the second ratchet tooth 32 engages with the pawl portion 33d of the lever pawl 33, each of the first through holes 41 and each of the second through holes 42 are arranged in such a way that the bolt 43 can be inserted into any combination of the first through hole 41 and the second through hole 42.

Herein, as illustrated in FIG. 6, the bolt 43 may be connected to the second jig 12 by a fall prevention tool 45. The fall prevention tool 45 is, for example, a wire rod such as a wire. One end portion of the fall prevention tool 45 is connected to the bolt 43 via a washer 46, and the other end portion of the fall prevention tool 45 is connected to the first side wall portion 26b or the second side wall portion 26c of the second jig 12 via a fixing plate 47.

This can prevent the bolt 43 from falling when the bolt 43 is removed from the first through hole 41 and the second through hole 42. However, the fall prevention tool 45 is not limited to the wire rod, and may have any configuration to be capable of preventing the bolt 43 from falling.

In addition, the fixing device 3 may include at least one of a first regulating portion 51 and a second regulating portion 52 for regulating a rotation range of the first jig 11 with respect to the second jig 12. More specifically, the first regulating unit 51 and the second regulating unit 52 regulate the rotation range of the first jig 11 within a range from a rotation angle of the first jig 11 with respect to the second jig 12 when the pawl portion 33d of the lever pawl 33 engages with the tooth portion 31b of the first ratchet tooth 31 or the tooth portion 32a of the second ratchet tooth 32 arranged on the most clockwise side between the tooth portion 31b and the tooth portion 32a when viewed from the Y axis plus side, to the rotation angle of the first jig 11 with respect to the second jig 12 when the pawl portion 33d of the lever pawl 33 engages with the tooth portion 31b of the first ratchet tooth 31 or the tooth portion 32a of the second ratchet tooth 32 arranged on the most counterclockwise side between the tooth portion 31b and the tooth portion 32a.

As illustrated in FIGS. 5 and 6, the first regulating portion 51 includes a pin 53 and a regulating groove 54. The pin 53 protrudes from the first side wall portion 22b or the second side wall portion 22c of the first jig 11 toward outside of the fixing device 3.

The regulating groove 54 is formed in the first side wall portion 26b or the second side wall portion 26c of the second jig 12. The regulating groove 54 is a circular arc groove having a third radius centered on the through hole 26d of the first side wall portion 26b or the through hole 26f of the second side wall portion 26c in the second jig 12, and the pin 53 is inserted into the regulating groove 54.

As illustrated in FIG. 2, the second regulating portion 52 includes a pin 55 and a regulating groove 56. The pin 55 protrudes from the first side wall portion 26b or the second side wall portion 26c of the second jig 12 toward inside of the fixing device 3. For example, as illustrated in FIG. 2, the pin 55 can be configured by causing a bolt 48 for connecting the fixing plate 47 to the first side wall portion 26b or the second side wall portion 26c of the second jig 12 to protrude from the first side wall portion 26b or the second side wall portion 26c toward the inside of the fixing device 3.

The regulating groove 56 is formed in the first side wall portion 22b or the second side wall portion 22c of the first jig 11. The regulating groove 56 is a circular arc groove having a fourth radius centered on the through hole 22i of the first side wall portion 22b or the through hole 22k of the second side wall portion 22c of the first jig 11, and the pin 55 is inserted into the regulating groove 56.

Thus, rotation of the first jig 11 can be regulated within a rotation range of the first jig 11 with respect to the second jig 12 in which the pawl portion 33d of the lever pawl 33 can engage with the tooth portion 31b of the first ratchet tooth 31 or the tooth portion 32a of the second ratchet tooth 32.

Incidentally, in the present example embodiment, the rotation of the first jig 11 is regulated between a state where a rotation angle of the first jig 11 in which the main surface portion 21a of the first jig 11 and the fixed portion 26a of the second jig 12 are arranged in parallel with the YZ plane is 0°, and a state where the main surface portion 21a of the first jig 11 is rotated 70° counterclockwise with respect to the fixed portion 26a of the second jig 12 when viewed from the Y axis plus side.

Further, it is preferable that the fixing device 3 includes a display unit 61 for displaying the rotation angle of the first jig 11 with respect to the second jig 12. As illustrated in FIG. 5 and the like, the display unit 61 includes a scale portion 62 and a value indicating portion 63.

The scale portion 62 is provided on an outer surface of the first side wall portion 26b or the second side wall portion 26c along the circular arc portion 26e of the first side wall portion 26b or the circular arc portion 26g of the second side wall portion 26c of the second jig 12, and, for example, when rotation of the first jig 11 is regulated to 0° to 70° as described above, a scale of 5° is indicated in a range of 0° to 70°.

However, a range of the scale and the like can be appropriately changed according to the rotation range of the first jig 11, a pitch of the groove portions with the tooth portion 31b of the first ratchet tooth 31 and the tooth portion 32a of the second ratchet tooth 32, and the like.

The value indicating portion 63 is provided on the outer surface of the first side wall portion 22b or the second side wall portion 22c of the first jig 11 in such a way as to move along the circular arc portion 26e of the first side wall portion 26b or the circular arc portion 26g of the second side wall portion 26c of the second jig 12 when the first jig 11 rotates, and indicates, for example, a scale of the scale portion 62 with a triangular tip portion. Thus, the rotation angle of the first jig 11 can be visually confirmed from the outside of the fixing device 3. However, the value indicating portion 63 may be configured to be capable of indicating the scale of the scale portion 62.

Figure 7:
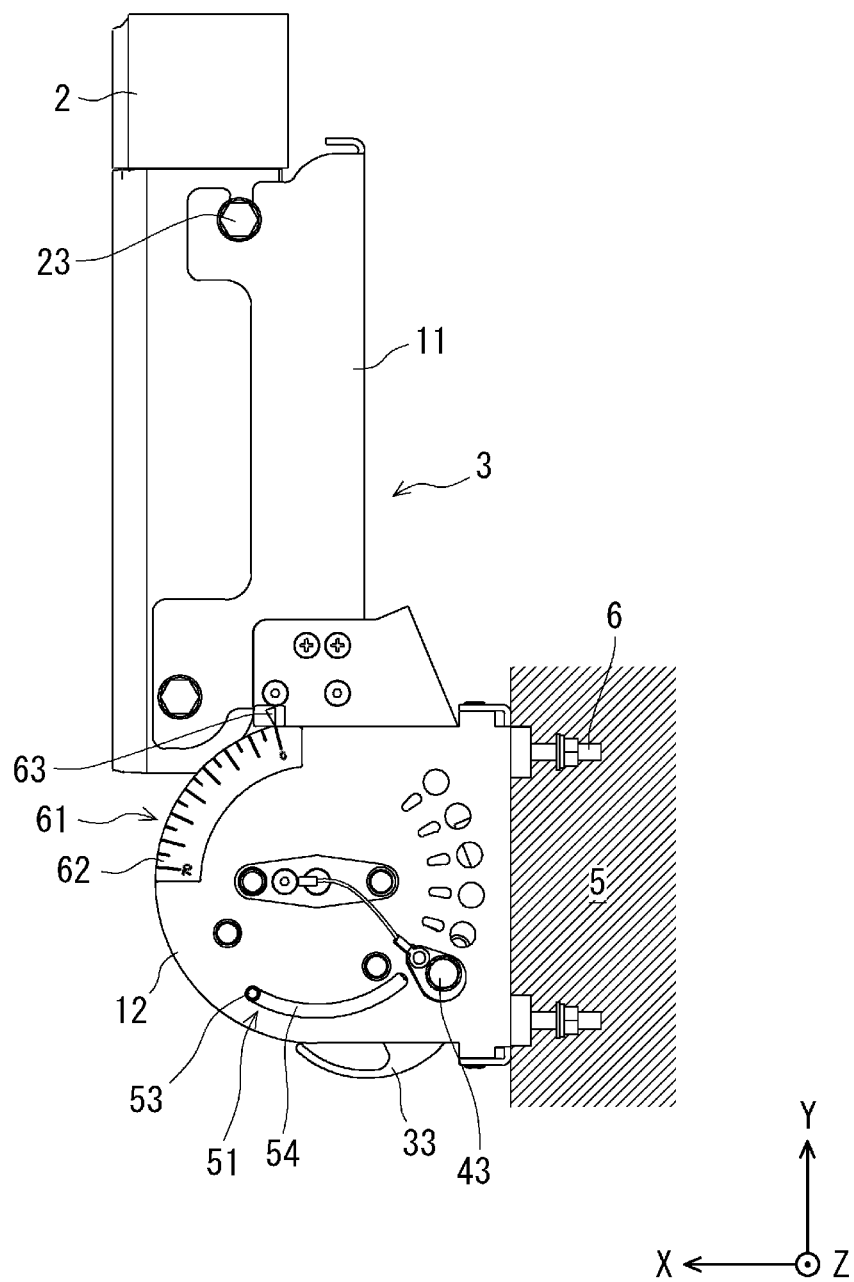
FIG. 7 is a side view illustrating an initial state where the communication device is fixed to a body.
Figure 8:
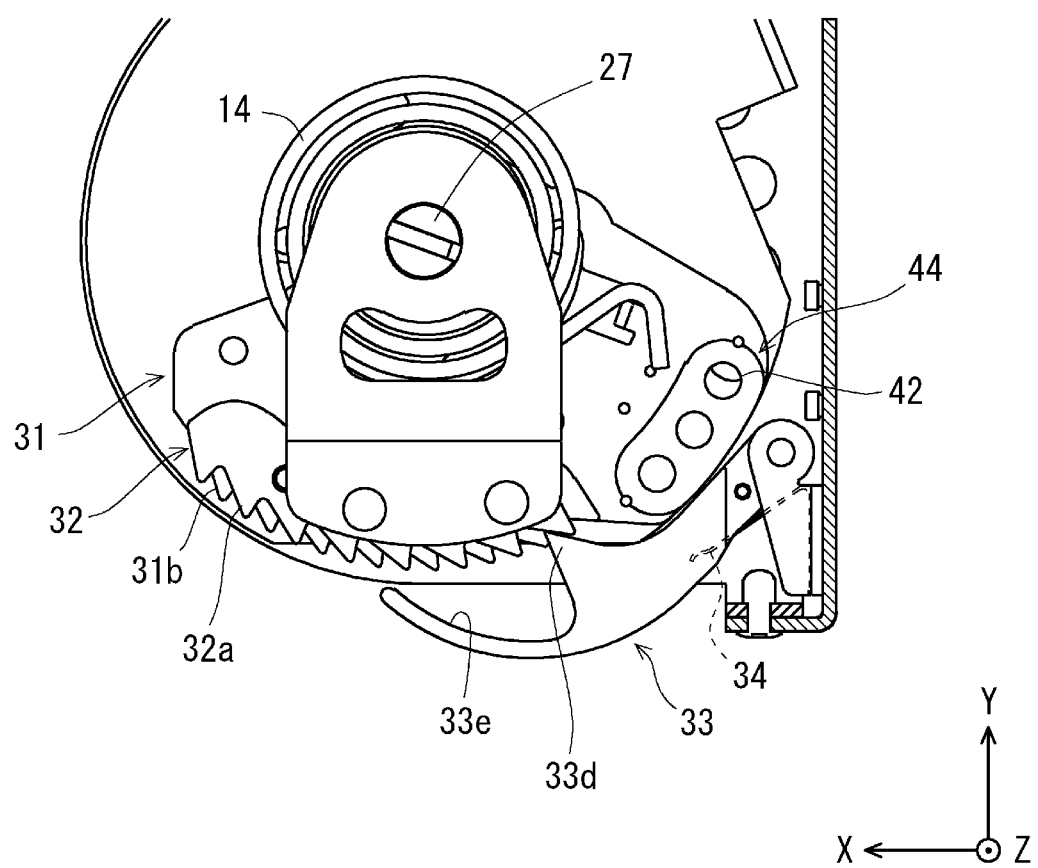
FIG. 8 is a diagram illustrating a relationship between a ratchet tooth and a lever pawl in an initial state where the communication device is fixed to the body.
Figure 9:
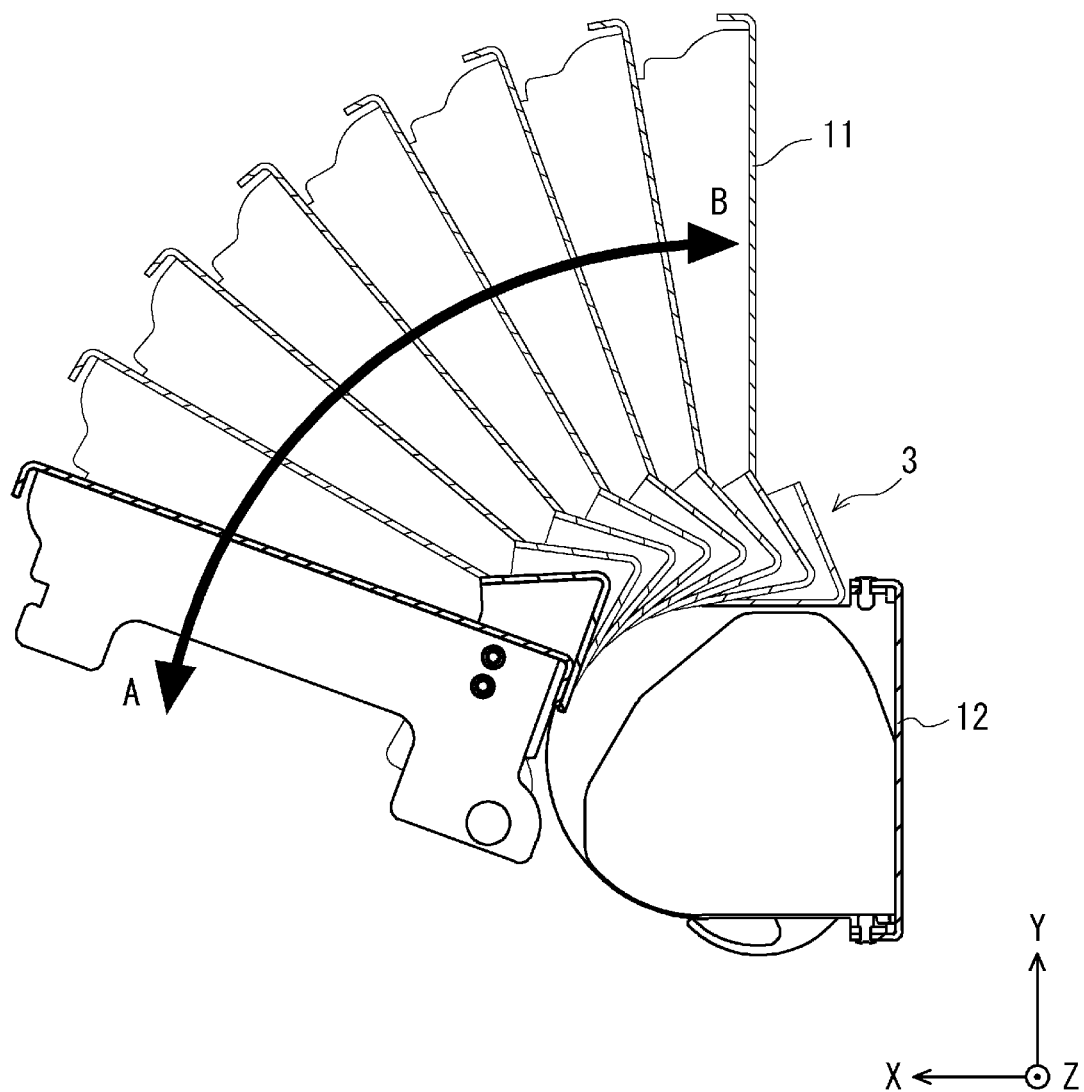
FIG. 9 is a diagram illustrating an operation of the fixing device when inclining communication equipment.
Figure 10:
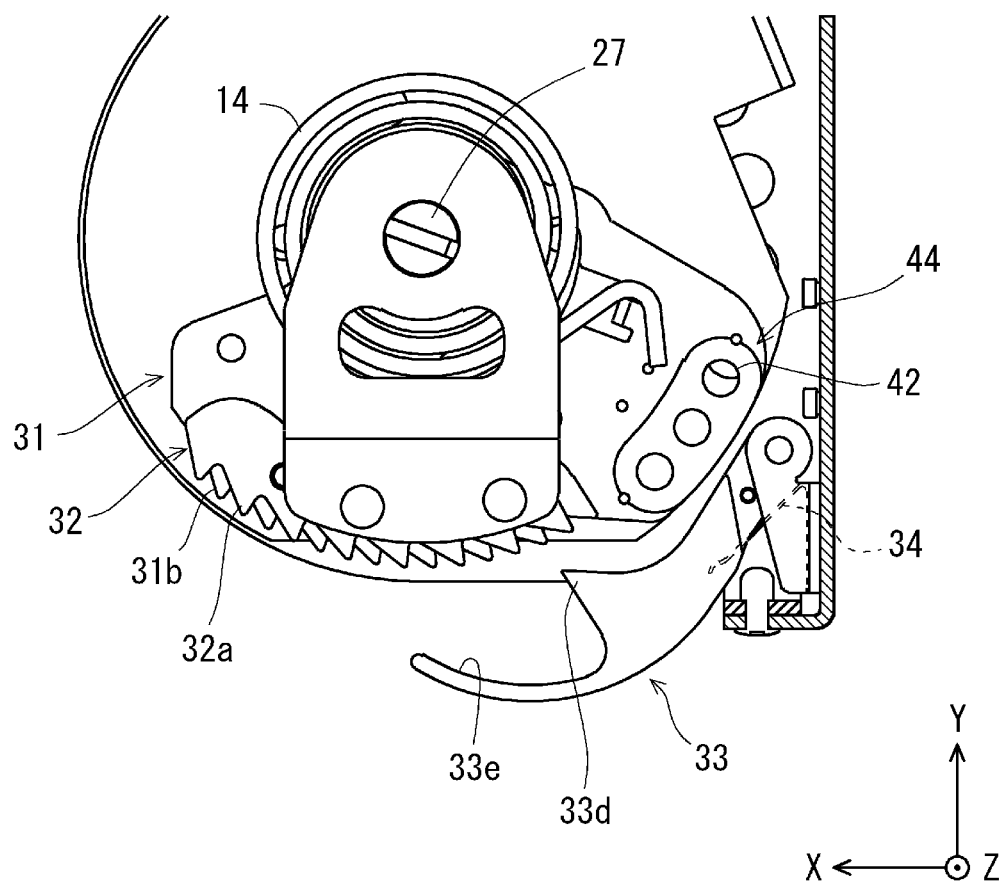
FIG. 10 is a diagram illustrating a relationship between a ratchet tooth and a lever pawl when inclining the communication equipment.
Figure 11:
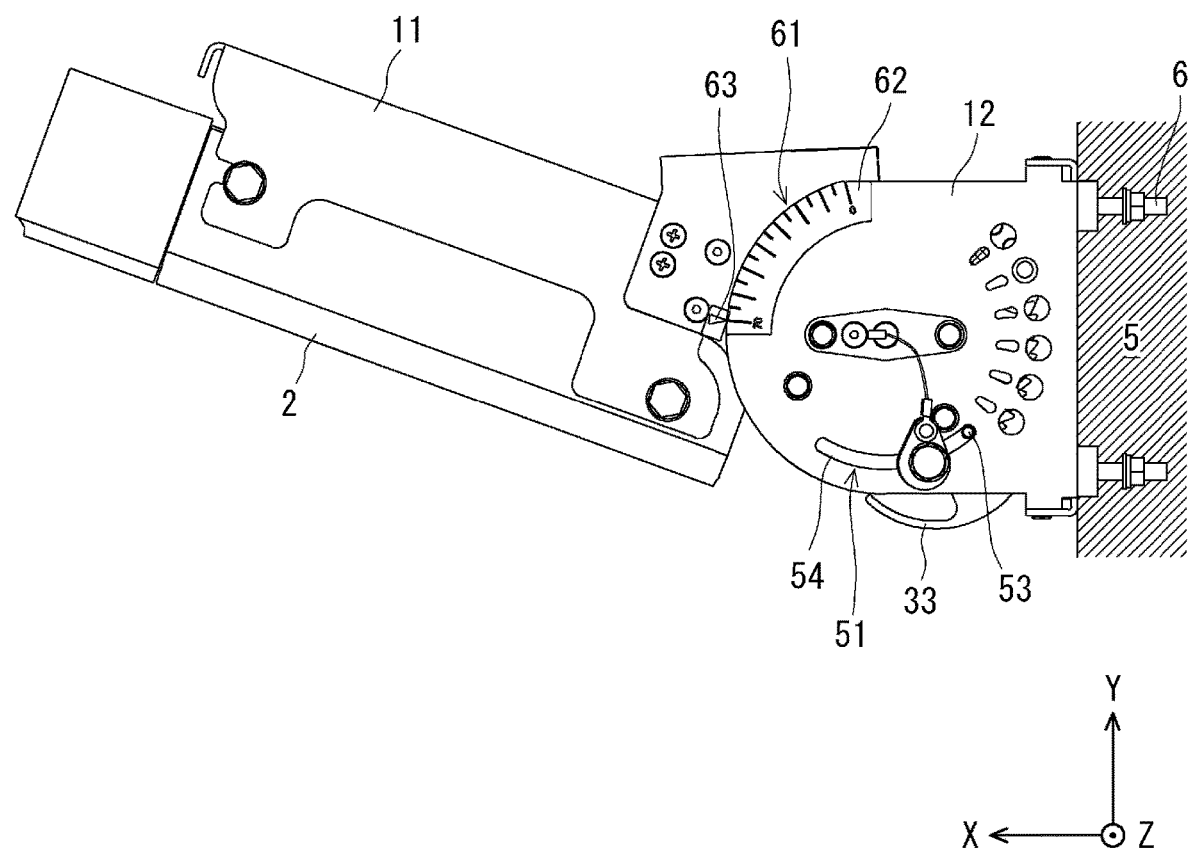
FIG. 11 is a side view illustrating a state where the communication equipment is inclined most.
Figure 12:
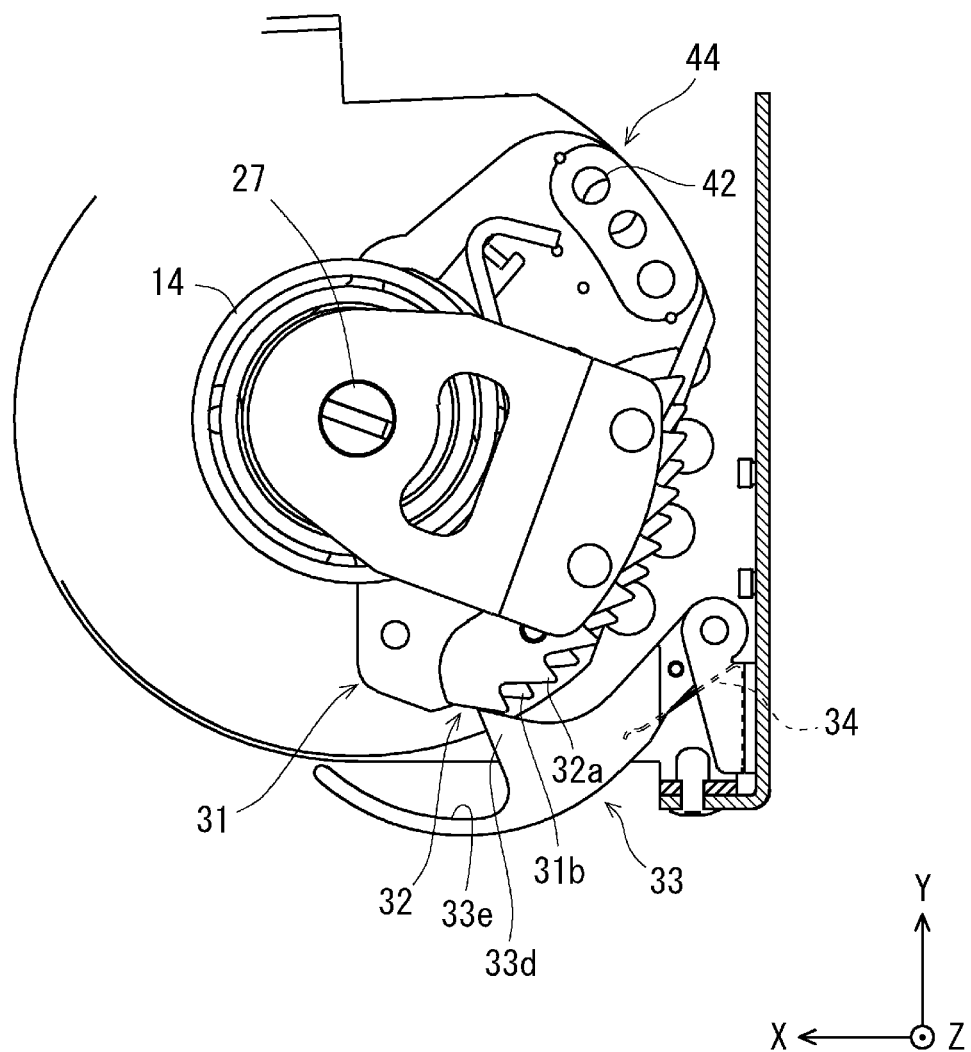
FIG. 12 is a diagram illustrating a relationship between a ratchet tooth and a lever pawl in a state where the communication equipment is inclined most.
Figure 13:
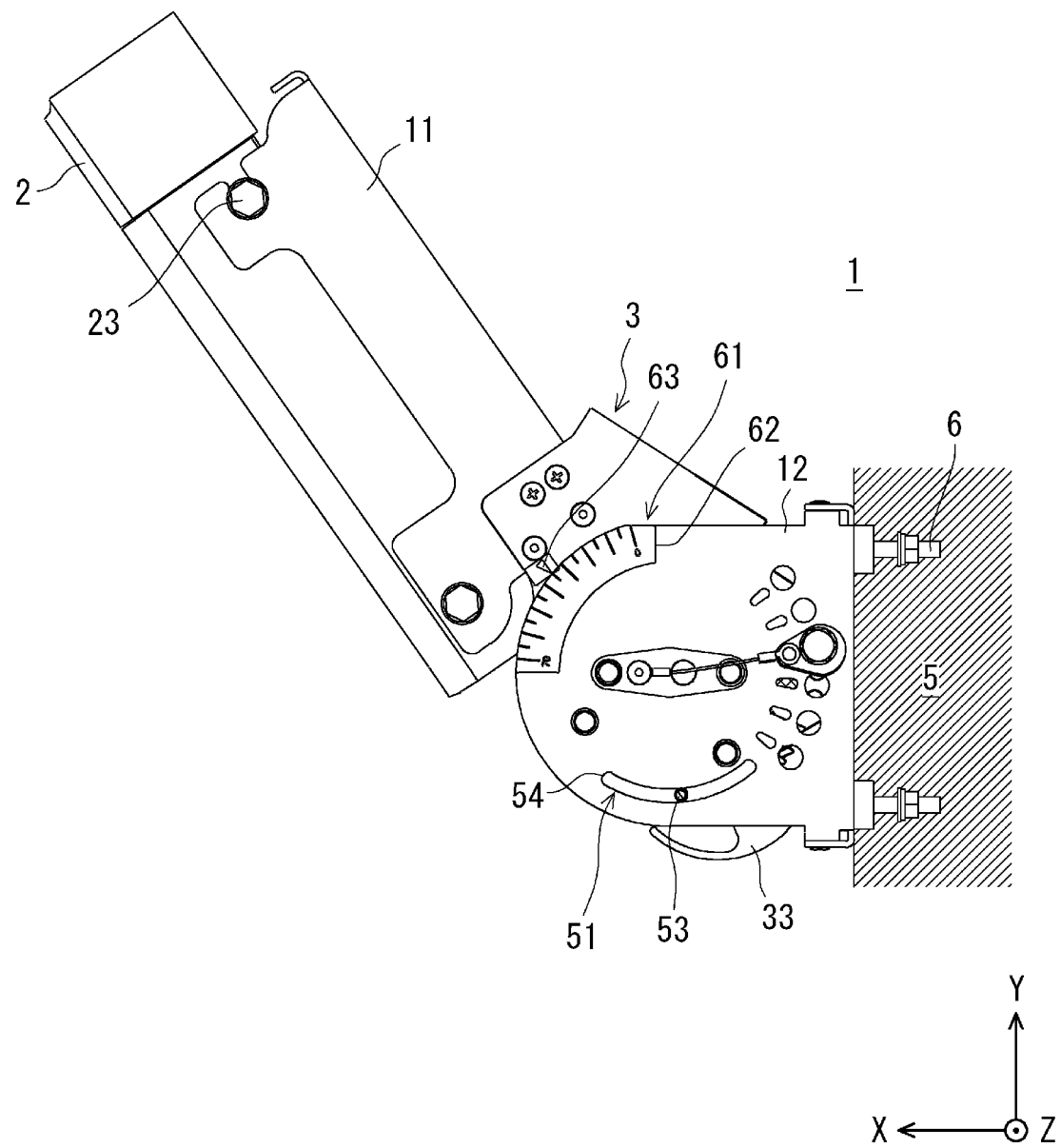
FIG. 13 is a side view illustrating a state after an inclination of the communication equipment is adjusted.
Figure 14:
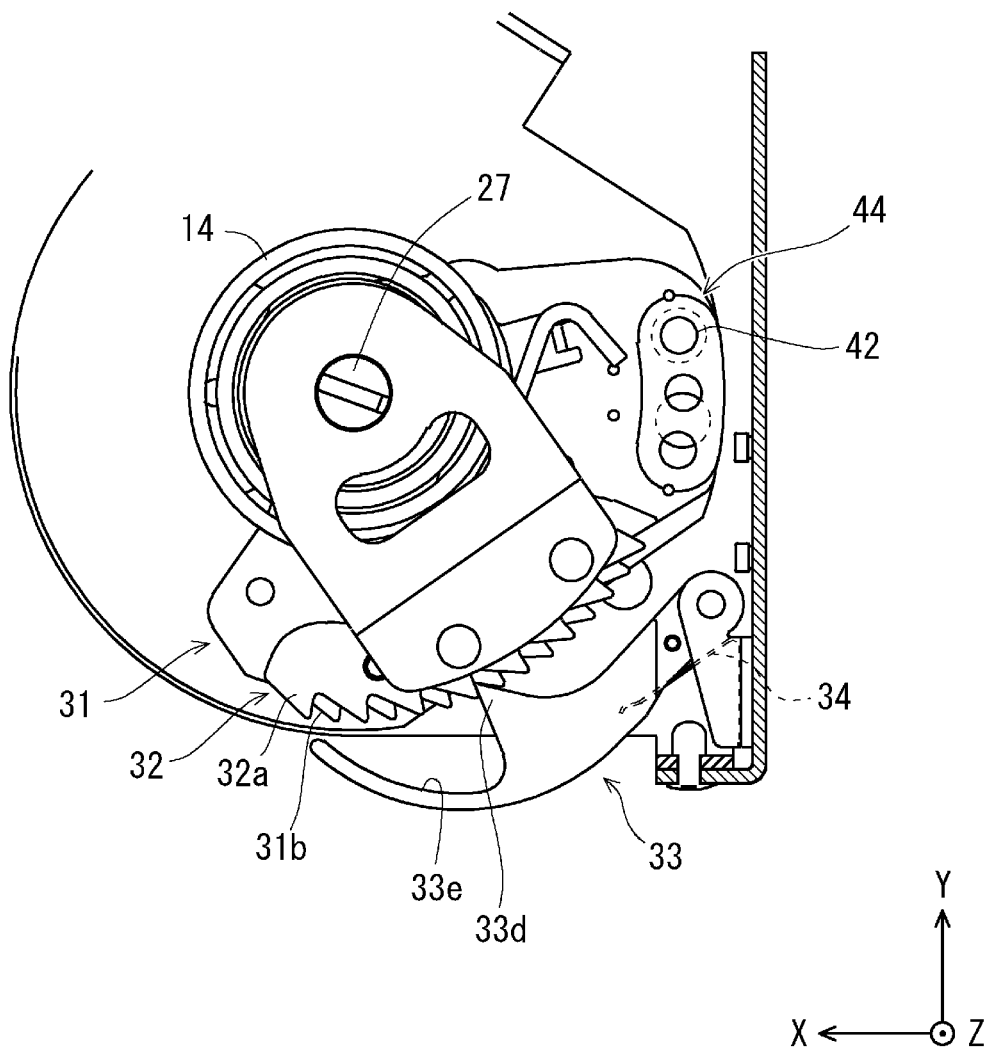
FIG. 14 is a diagram illustrating a relationship between a ratchet tooth and a lever pawl in a state after an inclination of the communication equipment is adjusted.
Figure 15:
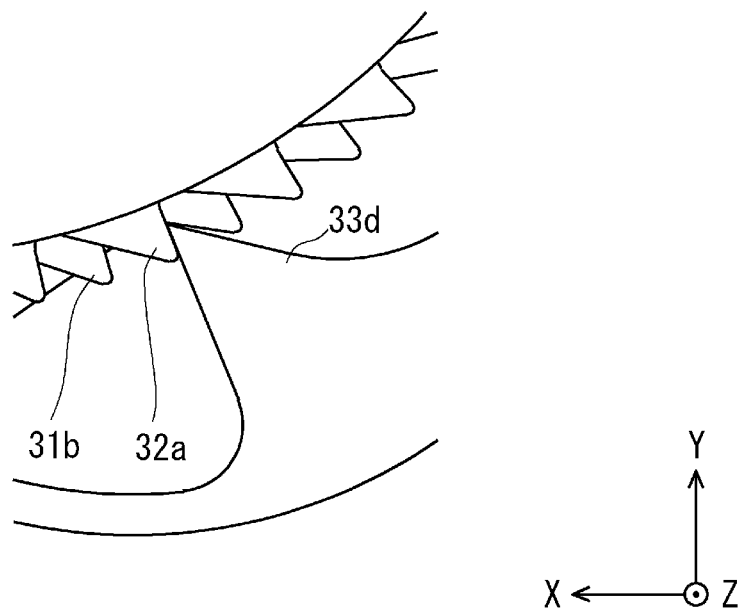
FIG. 15 is a diagram for explaining an operation of a lever pawl when the communication equipment is rotated.
Figure 16:
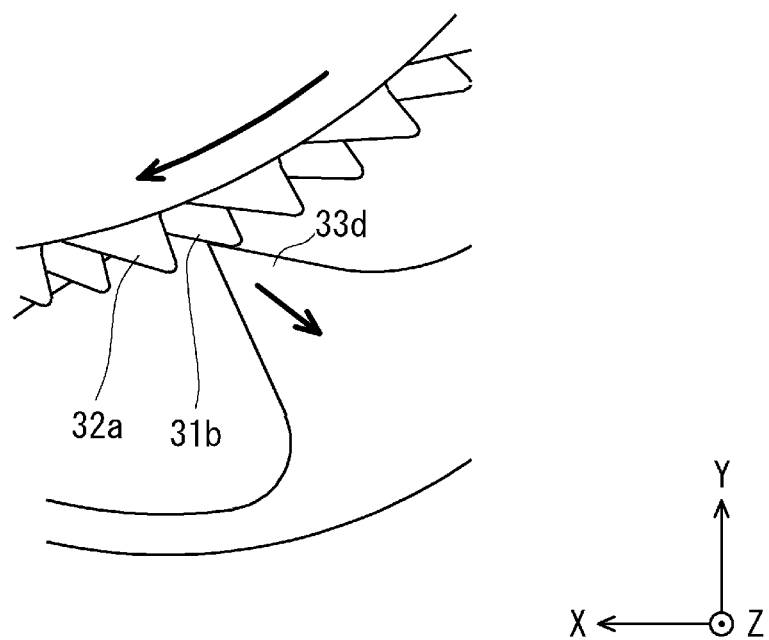
FIG. 16 is a diagram for explaining an operation of the lever pawl when the communication equipment is rotated.
Figure 17:
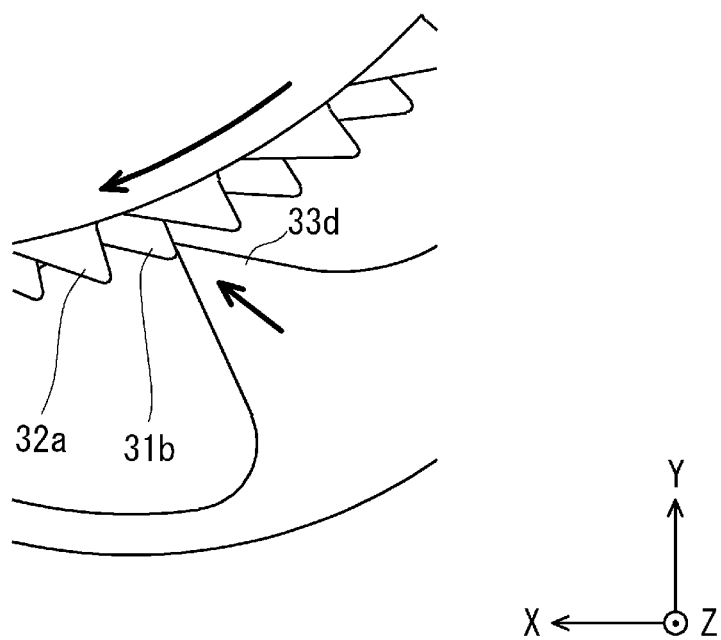
FIG. 17 is a diagram for explaining an operation of the lever pawl when the communication equipment is rotated.
Figure 18:
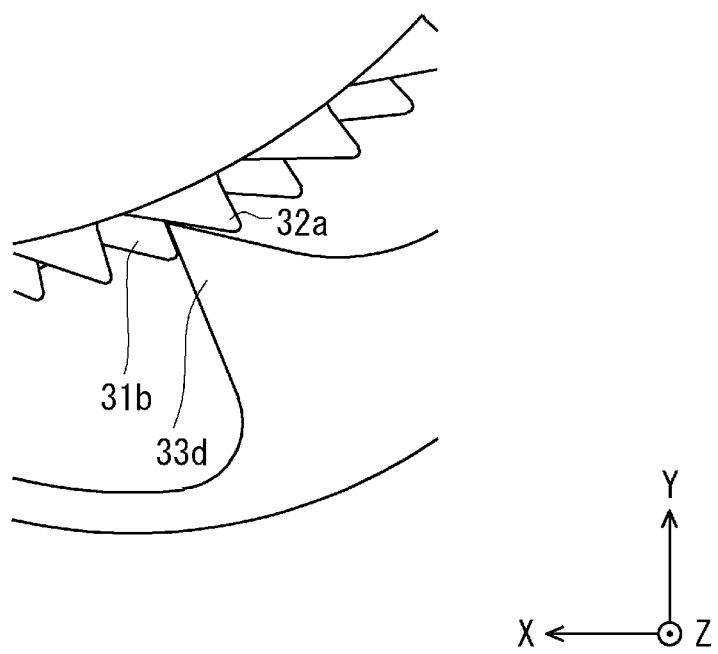
FIG. 18 is a diagram for explaining an operation of the lever pawl when the communication equipment is rotated.

Next, a flow of adjusting an inclination of the communication equipment 2 using the fixing device 3 according to the present example embodiment will be described. Herein, FIG. 7 is a side view illustrating an initial state where a communication device is fixed to a body. FIG. 8 is a diagram illustrating a relationship between a ratchet tooth and a lever pawl in an initial state where the communication device is fixed to the body. FIG. 9 is a diagram illustrating an operation of the fixing device when inclining the communication equipment. FIG. 10 is a diagram illustrating a relationship between the ratchet tooth and the lever pawl when inclining the communication equipment. FIG. 11 is a side view illustrating a state where the communication equipment is inclined most. FIG. 12 is a diagram illustrating a relationship between the ratchet tooth and the lever pawl in a state where the communication equipment is inclined most. FIG. 13 is a side view illustrating a state after an inclination of the communication equipment is adjusted. FIG. 14 is a diagram illustrating a relationship between the ratchet tooth and the lever pawl in a state after an inclination of the communication equipment is adjusted.

First, in order to fix the communication equipment 2 to the first jig 11 in a state of standing up most, an operator fixes the second jig 12 to a body 5 with a bolt 6 in a state where the first jig 11 is rotated clockwise most (i.e., in a state of 0°) with respect to the second jig 12 when viewed from the Y-axis plus side.

At this time, as illustrated in FIG. 8, the pawl portion 33d of the lever pawl 33 engages with the tooth portion 31b of the first ratchet tooth 31 or the tooth portion 32a of the second ratchet tooth 32 on the most counterclockwise side when viewed from the Y axis plus side. In addition, the bolt 43 is passed through the first through hole 41 and the second through hole 42, and screwed into the second through hole 42. Note that, in the present example embodiment, the pawl portion 33d of the lever pawl 33 engages with the tooth portion 31b of the first ratchet tooth 31 on the most counterclockwise side.

Then, as illustrated in FIG. 7, the bolt 23 is passed through the groove portion 21e and the through hole 21f of the first side wall portion 21b, and the groove portion 21g and the through hole 21h of the second side wall portions 21c in the first jig 11, the bolt 23 is screwed into a bolt hole on a side surfaces of the communication equipment 2, and thereby the communication equipment 2 is fixed to the first jig 11. At this time, the communication equipment 2 is placed on the second portion 22e of the placing portion 22a of the first jig 11. Then, as illustrated in FIG. 1, the wiring 4 electrically connected to the connector 2a of the communication equipment 2 is arranged between the first side wall portion 22b and the second side wall portion 22c of the first jig 11.

Next, an operator removes the bolt 43 from the first through hole 41 and the second through hole 42. Until the bolt 43 is removed from the first through hole 41 and the second through hole 42, rotation of the first jig 11 with respect to the second jig 12 is restrained by the bolt 43 during an operation of fixing the communication equipment 2 to the fixing device 3 as illustrated in FIG. 7, therefore the communication equipment 2 does not rotate even when an operator inadvertently touches the lever pawl 33, and safety can be secured.

Next, an operator picks the knob portion 33e of the lever pawl 33 with one hand of the operator, and rotates the lever main body 33a in a direction away from the first ratchet tooth 31 and the second ratchet tooth 32 as illustrated in FIG. 10.

Then, while maintaining this state, as illustrated in FIG. 9, an operator rotates the communication equipment 2 in a direction of an arrow A by the other hand of the operator in such a way that the communication equipment 2 becomes in a most inclined state (i.e., a state of 70°) via the first jig 11. Herein, in the following description, a direction in which the communication equipment 2 (first jig) rotates from 0° to 70° is defined as the direction of the arrow A, and a direction in which the communication equipment 2 rotates from 70° to 0° is defined as a direction of an arrow B.

At this time, since the first jig 11 tries to rotate in the direction of the arrow A due to weight of the communication equipment 2, an operator can easily rotate the first jig 11 only by attaching the other hand to the communication equipment 2. Then, as the first jig 11 rotates in the direction of the arrow A due to the weight of the communication equipment 2, biasing force can be stored in the biasing member 14. Further, since rotation of the first jig 11 is regulated by the first regulating portion 51 and the second regulating portion 52, operability is good.

Thereafter, an operator releases the knob portion 33e of the lever pawl 33, and as illustrated in FIG. 12, causes the pawl portion 33d of the lever pawl 33 to engage with the tooth portion 31b of the first ratchet tooth 31 or the tooth portion 32a of the second ratchet tooth 32 on a side closest to the direction of the arrow B.

At this time, in the present example embodiment, the pawl portion 33d of the lever pawl 33 engages with the tooth portion 32a of the second ratchet tooth 32 on the side closest to the direction of the arrow B, and the rotation of the first jig 11 with respect to the second jig 12 in the direction of the arrow A cannot be restrained by the lever pawl 33 and the second ratchet tooth 32, but the rotation of the first jig 11 in the direction of the arrow A is regulated by the first regulating portion 51 and the second regulating portion 52. Thus, as illustrated in FIG. 11, the rotation of the first jig 11 with respect to the second jig 12 in the direction of the arrow A can be restrained in a state where the communication equipment 2 is inclined most.

Next, an operator rotates the communication equipment 2 in the direction of the arrow B in such a way that the communication equipment 2 becomes a desired inclination. Herein, FIGS. 15 to 18 are diagrams for explaining an operation of the lever pawl when the communication equipment is rotated.

As described above, the tooth portion 31b of the first ratchet tooth 31 and the tooth portion 32a of the second ratchet tooth 32 have shapes permitting rotation of the first jig 11 with respect to the second jig 12 in the direction of the arrow B. Therefore, as illustrated in FIGS. 15 to 18, in a state where, as an operator pushes the communication equipment 2 in the direction of the arrow B, the lever pawl 33 is biased to a side approaching the first ratchet tooth 31 and the second ratchet tooth 32, while the pawl portion 33d of the lever pawl 33 rides over one of the tooth portion 31b of the first ratchet tooth 31 and the tooth portion 32a of the second ratchet tooth 32, the pawl portion 33d of the lever pawl 33 engages with the other of the tooth portion 31b of the first ratchet tooth 31 and the tooth portion 32a of the second ratchet tooth 32 adjacent in the direction of the arrow A.

Thus, as illustrated in FIG. 14, in a state where the communication equipment 2 is inclined to a desired inclination, the pawl portion 33d of the lever pawl 33 engages with the tooth portion 31b of the first ratchet tooth 31 or the tooth portion 32a of the second ratchet tooth 32, and the rotation of the first jig 11 with respect to the second jig 12 in the direction of the arrow A can be restrained.

Thereafter, as illustrated in FIG. 13, the bolt 43 is passed through the first through hole 41 and the second through hole 42, the bolt 43 is screwed into the second through hole 42, and thereby, a fixing operation of the communication device 1 is completed. At this time, an operator can pass the bolt 43 through the first through hole 41 and the second through hole 42 from outside of the fixing device 3.

Therefore, a bolt head of the bolt 43 is arranged outside the fixing device 3 with respect to the first jig 11 and the second jig 12. Further, since the bolt 43 is connected to the second jig 12 by the fall prevention tool 45, workability when the bolt 43 is passed through the first through hole 41 and the second through hole 42 is good.

Further, since the wiring 4 electrically connected to the connector 2a of the communication equipment 2 is arranged between the first side wall portion 22b and the second side wall portion 22c of the first jig 11, the wiring 4 hardly interferes with the fixing device 3 when adjusting an inclination of the communication equipment 2. Therefore, workability when adjusting the inclination of the communication equipment 2 can be improved.

Figure 19:
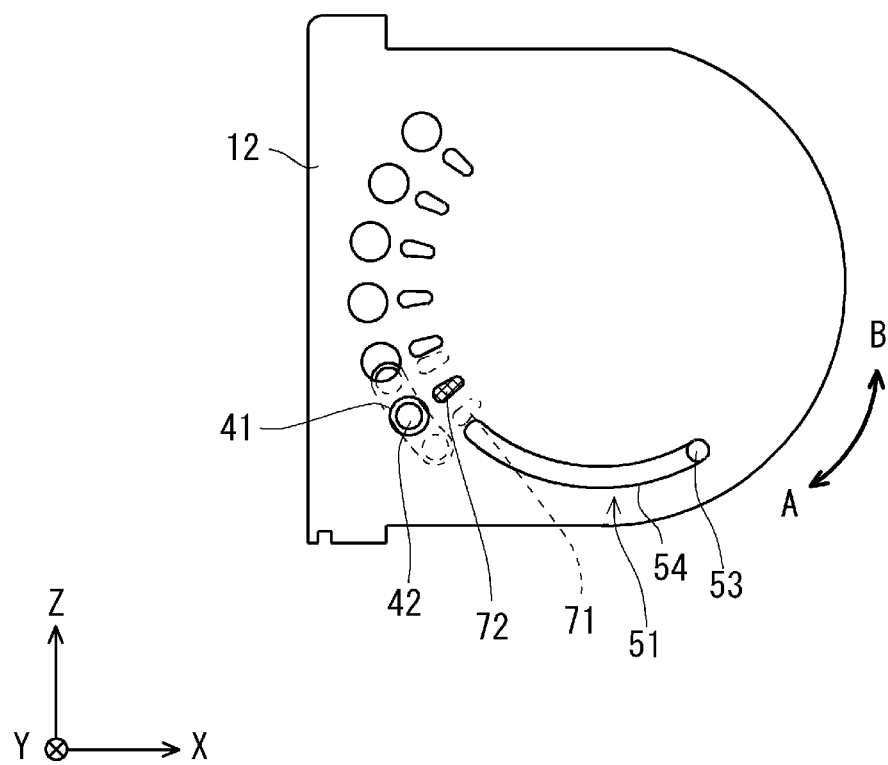
FIG. 19 is a diagram for explaining a part of a combination of a first through hole and a second through hole.
Figure 20:
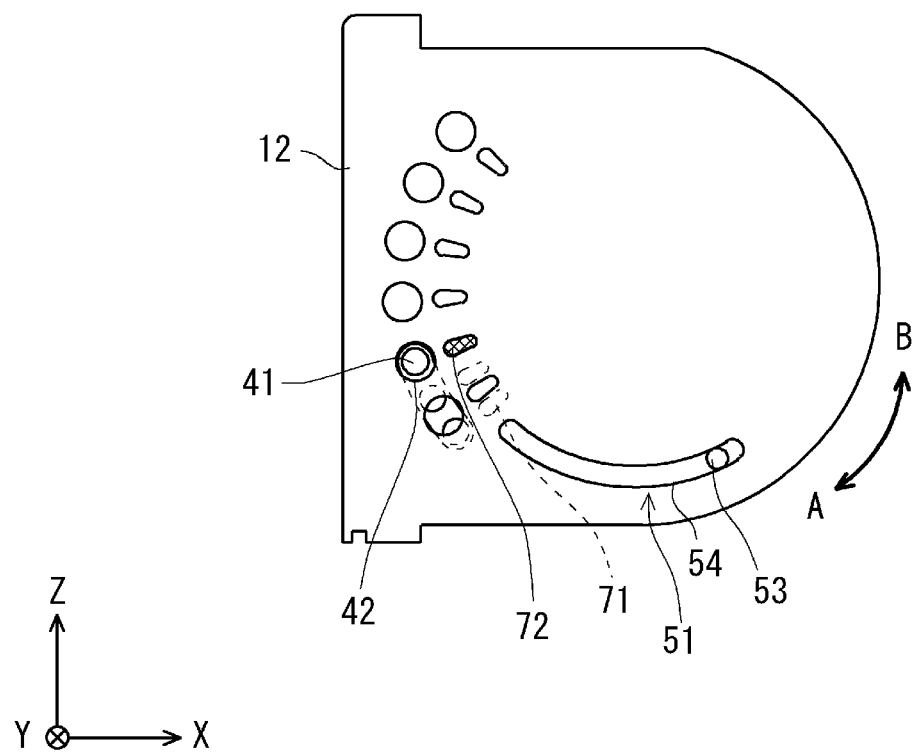
FIG. 20 is a diagram for explaining a part of a combination of the first through hole and the second through hole.
Figure 21:
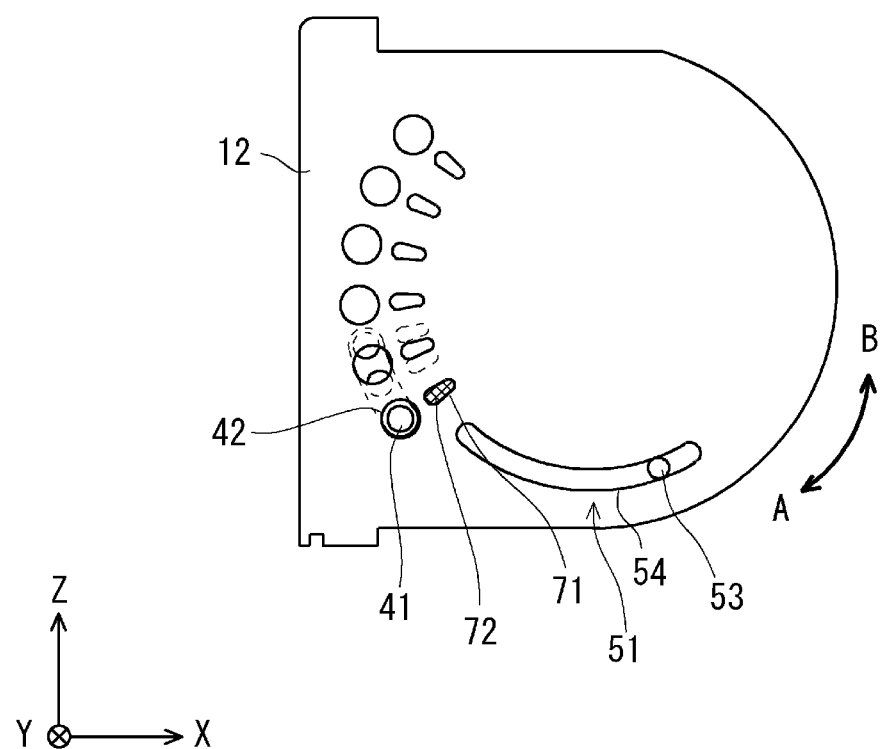
FIG. 21 is a diagram for explaining a part of a combination of the first through hole and the second through hole.

Herein, FIGS. 19 to 21 are diagrams for explaining a part of a combination of the first through hole and the second through hole. Incidentally, FIGS. 19 to 21 are diagrams when viewed from the Y-axis minus side. For example, when a rotation angle of the communication equipment 2 is 0°, as illustrated in FIG. 19, a first through hole 41 arranged on a side closest to the direction of the arrow B among the six first through holes 41 and a second through hole 42 arranged at the center among the three second through holes 42 overlap with each other in such a way that the bolt 43 can pass therethrough as the mutually selected through holes.

When the rotation angle of the communication device 2 is 5°, as illustrated in FIG. 20, a first through hole 41 adjacent to a first through hole 41 arranged on a side closest to the direction of the arrow B in the direction of the arrow A, and a second through hole 42 adjacent to a second through hole 42 at the center in the direction of the arrow A overlap with each other in such a way that the bolt 43 can pass therethrough as the mutually selected through holes.

When the rotation angle of the communication device 2 is 10°, as illustrated in FIG. 21, the first through hole 41 arranged on a side closest to the direction of the arrow B, and a second through hole 42 adjacent to a second through hole 42 at the center in the direction of the arrow B overlap with each other in such a way that the bolt 43 can pass therethrough as the mutually selected through holes.

Then, as the rotation angle of the communication equipment 2 increases, the first through hole 41 combined with the second through hole 42 shifts in the direction of the arrow A, and overlaps with the second through hole 42 in such a way that the bolt 43 can pass through the first through hole 41 and the second through hole 42, similarly to the above-described pattern.

By combining the plurality of first through holes 41 and the plurality of second through holes 42 in this manner, the first jig 11 can be fixed to the second jig 12 at each preset angle while minimizing the number of the first through holes 41 and the number of the second through holes 42.

Therefore, it is possible to suppress enlargement of the first jig 11 and the second jig 12. In addition, the first through hole 41 and the second through hole 42 can be arranged at positions away from the rotation shaft 27 while suppressing the enlargement of the first jig 11 and the second jig 12, and a shearing load on the bolt 43 can be reduced.

Herein, it is preferable that an operator can visually recognize, from outside, a combination of the first through hole 41 and the second through hole 42 which overlap as described above. Therefore, as illustrated in FIG. 19 and the like, the fixing device 3 may include a marking portion 71 and a visually recognizing portion 72.

The marking portion 71 is a portion indicating a position of the second through hole 42. For example, as illustrated in FIG. 4, the marking portion 71 is a colored portion fixed to the outer surface of the first ratchet tooth 31. The marking portion 71 is formed in an elongated shape extending on a line connecting the center of each of the second through holes 42 and the center of the through hole 31a, and is arranged on a side of the through hole 31a with respect to the second through hole 42 in such a way as to extend along the second through hole 42.

The marking portion 71 described above is arranged in such a way as to substantially overlap with an opening 22r formed in the first side wall portion 22b of the first jig 11 and an opening 22s formed in the second side wall portion 22c of the first jig 11 when viewed from the outside of the fixing device 3.

The visually recognizing portion 72 is, for example, a through hole formed in the first side wall portion 26b or the second side wall portion 26c of the second jig 12. Then, the visually recognizing portion 72 is formed in an elongated shape extending on a line connecting the center of the through hole 26d of the first side wall portion 26b or the center of the through hole 26f of the second side wall portion 26c, and the center of the first through hole 41.

At a place overlapped with the first through hole 41 and the second through hole 42 in such a way that the bolt 43 can be passed therethrough, as illustrated in FIG. 19 and the like, the marking portion 71 and the visually recognizing portion 72 are arranged in such a way that the marking portion 71 arranged on a line connecting the center of the first through hole 41 and the center of the through hole 26d or the center of the through hole 26f can be visually recognized from the visually recognizing portion 72. Note that, in FIG. 19 and the like, the marking portion 71 which can be visually recognized from the visually recognizing portion 72 is illustrated by hatching or the like.

On the other hand, other marking portion 71 is covered with the first side wall portion 26b or the second side wall portion 26c of the second jig 12, and the marking portion 71 and the visually recognizing portion 72 are arranged in such a way as not to be capable of visually recognizing from the visually recognizing portion 72. Thus, when an operator passes the bolt 43 through the first through hole 41 and the second through hole 42, a combination of the first through hole 41 and the second through hole 42 through which the bolt 43 can pass can be easily visually recognized from the outside, and workability when adjusting the inclination of the communication equipment 2 can be improved.

The fixing device 3, the fixing method, and the communication device 1 according to the example embodiment described above can store biasing force of the biasing member 14 by the weight of the communication equipment 2. Therefore, it is possible to improve workability when an operator adjusts the inclination of the communication equipment 2. Moreover, a combination of the ratchet mechanism 13 and the biasing member 14 makes it possible for an operator to adjust the inclination of the communication equipment 2 comfortably, and also to improve the workability when adjusting the inclination of the communication equipment 2.

At this time, in the present example embodiment, since the wiring 4 electrically connected to the connector 2a of the communication equipment 2 is arranged between the first side wall portion 22b and the second side wall portion 22c of the first jig 11, the wiring 4 hardly interferes with the fixing device 3 when adjusting the inclination of the communication equipment 2. Therefore, workability when adjusting the inclination of the communication equipment 2 can be improved.

In addition, the fixing device 3, the fixing method, and the communication device 1 according to the present example embodiment are configured in such a way that an operator can pass the bolt 43 through the first through hole 41 and the second through hole 42 from the outside of the fixing device 3, and workability when passing the bolt 43 through the first through hole 41 and the second through hole 42 is good. At this time, when the bolt 43 is connected to the second jig 12 by the fall prevention tool 45, it is possible to further improve the workability when passing the bolt 43 through the first through hole 41 and the second through hole 42.

In addition, when the fixing device 3 and the communication device 1 according to the present example embodiment include at least one of the first regulating portion 51 and the second regulating portion 52 for regulating a rotation range of the first jig 11 with respect to the second jig 12, rotation of the first jig 11 can be regulated, and the workability when an operator adjusts the inclination of the communication equipment 2 can be improved.

In addition, when the fixing device 3 and the communication device 1 according to the present example embodiment include the display unit 61 for displaying the rotation angle of the first jig 11 with respect to the second jig 12, the rotation angle of the first jig 11, and thus the inclination of the communication equipment 2, can be visually confirmed from the outside of the fixing device 3.

In addition, when the fixing device 3 and the communication device 1 according to the present example embodiment include the marking portion 71 and the visually recognizing portion 72, the combination of the first through hole 41 and the second through hole 42 through which the bolt 43 can be passed can be easily visually recognized from the outside of the fixing device 3, and the workability when adjusting the inclination of the communication equipment 2 can be improved.

In addition, when the ratchet mechanism 13 includes the first ratchet tooth 31 and the second ratchet tooth 32, a pitch of the tooth portion of the ratchet mechanism 13 can be reduced while reducing a size of the ratchet tooth. Thus, the inclination of the communication equipment 2 can be finely adjusted while reducing a size of the fixing device 3 and the communication device 1.

Then, since a pitch of the tooth portion 31*b* of the first ratchet tooth 31 and the tooth portion 32*a* of the second ratchet tooth 32 can be increased as compared with a case where the ratchet mechanism 13 is configured by one ratchet tooth, for example, the first ratchet tooth 31 and the second ratchet tooth 32 can be easily manufactured by press working. However, the ratchet mechanism 13 may include a plurality of ratchet teeth, and in this case, tooth portions of the ratchet teeth are arranged in such a way as to shift a phase with each other.

Other Example Embodiments

Figure 22:
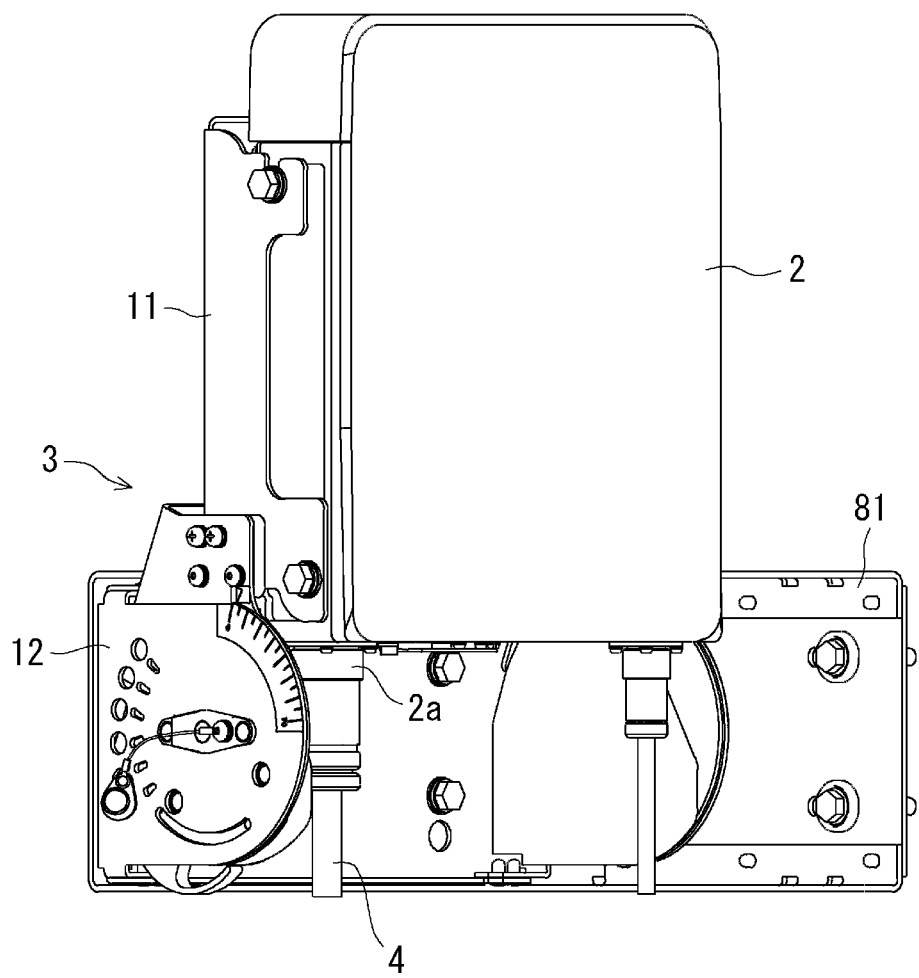
FIG. 22 is a perspective view illustrating a communication device according to another example embodiment.
Figure 23:
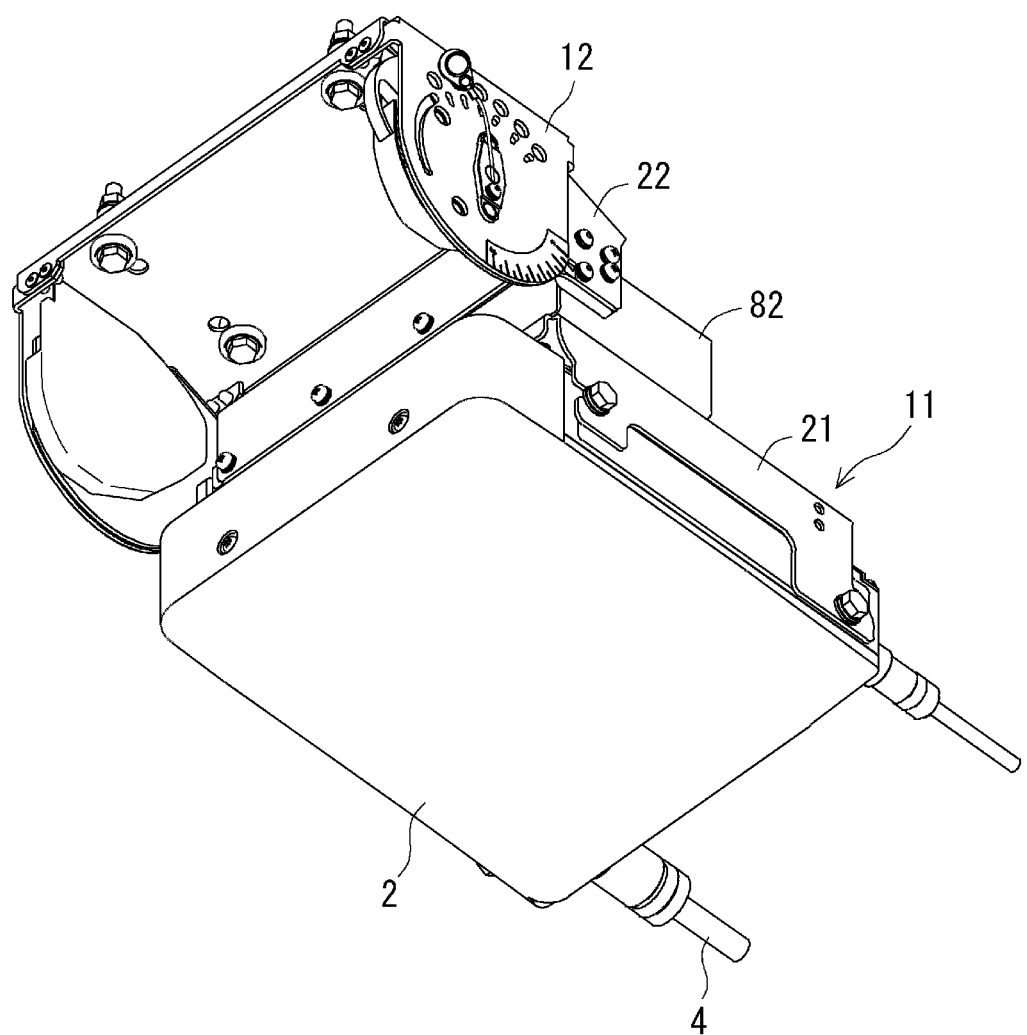
FIG. 23 is a perspective view illustrating a communication device according to the another example embodiment.
Figure 24:
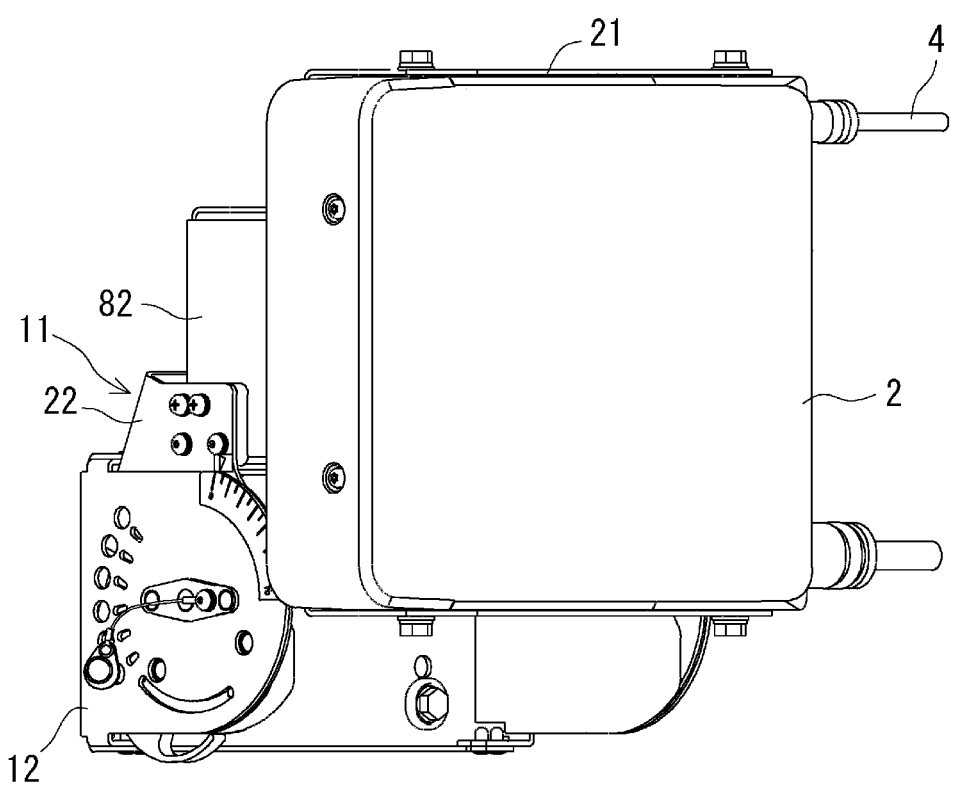
FIG. 24 is a perspective view illustrating a communication device according to the another example embodiment.

In the first example embodiment, the fixed portion 26*a* of the second jig 12 is directly fixed to the body 5, but when the fixed portion 26*a* of the second jig 12 cannot be directly fixed to the body 5, for example, as illustrated in FIG. 22, the fixed portion 26*a* may be fixed to the body 5 via an L-shaped adapter 81. As illustrated in FIGS. 23 and 24, by interposing an adapter 82 between a bracket 21 and an arm 22 of a first jig 11, communication equipment 2 can be fixed to a fixing device in a different form.

The above example embodiments are merely an example relating to application of a technical idea obtained by the inventor of the present invention. In other words, the technical idea is not limited to the example embodiments described above, and various modifications are possible.

For example, the fixing device 3 and the communication device 1 according to the first example embodiment include the ratchet mechanism 13, the biasing member 14, the fixing unit 15, and the like on both the Y-axis plus side and the Y-axis minus side, but may include at least on one of the Y-axis plus side and the Y-axis minus side.

For example, the first jig 11 and the second jig 12 are not limited to the above-described configuration, and may be configured in such a way that the communication equipment 2 can be rotatably fixed to the body 5 or the like.

Some or all of the above-described example embodiments may be described as the following Supplementary Note, but the present invention is not limited to the following.

(Supplementary Note 1)

A fixing device comprising:

a first jig configured to fix communication equipment;

a second jig configured to rotatably support the first jig about a rotation shaft;

a ratchet mechanism configured to be capable of switching restraint or permission of rotation of the first jig in one direction with respect to the second jig, on which the first jig intends to rotate with respect to the second jig due to weight of the communication equipment, and permit rotation of the first jig in another direction with respect to the second jig; and a first biasing member configured to store biasing force when the first jig rotates in the one direction with respect to the second jig due to weight of the communication equipment, and bias rotation of the first jig in another direction with respect to the second jig.

(Supplementary Note 2)

The fixing device according to Supplementary Note 1, further comprising a fixing unit configured to fix a rotation angle of the first jig with respect to the second jig, wherein the fixing unit includes a plurality of first through holes being formed on one of the first jig and the second jig on a circular arc having a first radius centered on the rotation shaft, a second through hole being formed on another of the first jig and the second jig on a circular arc having the first radius centered on the rotation shaft, and a fastener being passed through each of the first through holes and the second through hole.

(Supplementary Note 3)

The fixing device according to Supplementary Note 2, wherein the second through hole is arranged inside the fixing device with respect to the first through hole, another of the first jig and the second jig is provided with a marking portion configured to indicate a position of the second through hole, and one of the first jig and the second jig is provided with a visually recognizing portion configured to overlap with the marking portion and enable the marking portion to be visually recognized when the first through hole and the second through hole are arranged in such a way that the fastener can be passed mutually therethrough.

(Supplementary Note 4)

The fixing device according to Supplementary Note 2 or 3, wherein the fastener is a bolt, and a head of the bolt is arranged outside the fixing device.

(Supplementary Note 5)

The fixing device according to any one of Supplementary Notes 2 to 4, wherein the fastener is connected to one of the first jig and the second jig via a fall prevention tool.

(Supplementary Note 6)

The fixing device according to any one of Supplementary Notes 1 to 5, further comprising a display unit configured to display a rotation angle of the first jig with respect to the second jig.

(Supplementary Note 7)

The fixing device according to any one of Supplementary Notes 1 to 6, further comprising a regulating portion configured to regulate a rotation range of the first jig with respect to the second jig.

(Supplementary Note 8)

The fixing device according to any one of Supplementary Notes 1 to 7, wherein the ratchet mechanism includes a first ratchet tooth having a tooth portion being formed on an outer periphery, a second ratchet tooth having a tooth portion being formed on an outer periphery, a lever pawl configured to be rotatable in such a way as to switch between an engaged state and a non-engaged state with a tooth portion of the first ratchet tooth or the second ratchet tooth, and a second biasing member configured to bias the lever pawl toward a tooth portion of the first ratchet tooth or the second ratchet tooth, and a tooth portion of the first ratchet tooth and a tooth portion of the second ratchet tooth are arranged by shifting a phase with each other.

(Supplementary Note 9)

A communication device comprising:

the fixing device according to any one of Supplementary Notes 1 to 8; and communication equipment configured to be fixed to the fixing device.

(Supplementary Note 10)

A fixing method comprising:

a process of, between a first jig to which communication equipment is fixed and a second jig to be rotatably connected with the first jig via a rotation shaft, in a state where a ratchet mechanism being capable of switching restraint or permission of rotation of the first jig in one direction with respect to the second jig, on which the first jig intends to rotate with respect to the second jig due to weight of the communication equipment, and permitting rotation of the first jig in another direction with respect to the second jig is interposed, permitting rotation of the first jig in the one direction with respect to the second jig by the ratchet mechanism, also rotating the first jig in the one direction with respect to the second jig due to weight of the communication equipment, and storing biasing force of a biasing member being connected to the first jig and the second jig; and a process of restraining rotation of the first jig in the one direction with respect to the second jig by the ratchet mechanism, also biasing rotation of the first jig in the another direction with respect to the second jig by the biasing member, and rotating the first jig in the another direction with respect to the second jig.

(Supplementary Note 11)

A fixing device comprising:

a first jig configured to fix communication equipment;

a second jig configured to rotatably support the first jig about a rotation shaft; and a fixing unit configured to fix a rotation angle of the first jig with respect to the second jig, wherein the fixing unit includes a plurality of first through holes being formed on one of the first jig and the second jig on a circular arc having a first radius centered on the rotation shaft, a plurality of second through holes being formed on another of the first jig and the second jig on a circular arc having the first radius centered on the rotation shaft, and a fastener being passed through each of the first through holes and each of the second through holes, and the first jig can be fixed at each preset angle with respect to the second jig by a combination of a first through hole being selected from among the plurality of first through holes and a second through hole being selected from among the plurality of second through holes.

(Supplementary Note 12)

The fixing device according to Supplementary Note 11, wherein the second through hole is arranged inside the fixing device with respect to the first through hole, another of the first jig and the second jig is provided with a marking portion configured to indicate a position of the second through hole, and one of the first jig and the second jig is provided with a visually recognizing portion configured to overlap with the marking portion and enable the marking portion to be visually recognized when the first through hole and the second through hole are arranged in such a way that the fastener can be passed mutually therethrough.

(Supplementary Note 13)

The fixing device according to Supplementary Note 11 or 12, wherein the fastener is a bolt, and a head of the bolt is arranged outside the fixing device.

(Supplementary Note 14)

The fixing device according to any one of Supplementary Notes 11 to 13, wherein the fastener is connected to one of the first jig and the second jig via a fall prevention tool.

(Supplementary Note 15)

The fixing device according to any one of Supplementary Notes 11 to 14, further including a display unit configured to display a rotation angle of the first jig with respect to the second jig.

(Supplementary Note 16)

The fixing device according to any one of Supplementary Notes 11 to 15, further including a regulating portion configured to regulate a rotation range of the first jig with respect to the second jig.

(Supplementary Note 17)

The fixing device according to any one of Supplementary Notes 11 to 16, further including:

a ratchet mechanism configured to be capable of switching restraint or permission of rotation of the first jig in one direction with respect to the second jig, on which the first jig intends to rotate with respect to the second jig due to weight of the communication equipment, and permit rotation of the first jig in another direction with respect to the second jig; and a first biasing member configured to store biasing force when the first jig rotates in the one direction with respect to the second jig due to weight of the communication equipment, and bias rotation of the first jig in another direction with respect to the second jig.

(Supplementary Note 18)

The fixing device according to Supplementary Note 17, wherein the ratchet mechanism includes a first ratchet tooth having a tooth portion being formed on an outer periphery, a second ratchet tooth having a tooth portion being formed on an outer periphery, a lever pawl configured to be rotatable in such a way as to switch between an engaged state and a non-engaged state with a tooth portion of the first ratchet tooth or the second ratchet tooth, and a second biasing member configured to bias the lever pawl toward a tooth portion of the first ratchet tooth or the second ratchet tooth, and a tooth portion of the first ratchet tooth and a tooth portion of the second ratchet tooth are arranged by shifting a phase with each other.

(Supplementary Note 19)

A communication device including:

the fixing device according to any one of Supplementary Notes 11 to 18; and communication equipment to be fixed to the fixing device.

While the invention of the present application has been described above with reference to the example embodiments, the invention of the present application is not limited to the above. Various modifications can be made to the structure and details of the invention of the present application which can be understood by a person skilled in the art within the scope of the invention.

This application is based upon and claims the benefit of priority from Japanese patent application No. 2020-62061, filed on Mar. 31, 2020, the disclosure of which is incorporated herein in its entirety by reference.

INDUSTRIAL APPLICABILITY

The present disclosure relates to, for example, a fixing device, a fixing method, and a communication device for fixing communication equipment such as an antenna integrated-type base station of a fifth generation mobile communication system (5G).

REFERENCE SIGNS LIST

1 Communication Device
2 Communication Equipment
2a Connector
3 Fixing Device
4 Wiring
5 Body
6 Bolt
11 First Jig
21 Bracket
21a Main Surface Portion
21d Opening
21b First Side Wall Portion
21e Groove Portion
21f Through Hole
21c Second Side Wall Portion
21g Groove Portion
21h Through Hole
21i Bolt Hole
22 Arm
22a Placing Portion
22d First Portion
22e Second Portion
22b First Side Wall Portion
22f Notched Portion
22g First Portion
22h Second Portion
22i Through Hole
22j Circular Arc Portion
22p, 22r Opening
22c Second Side Wall Portion
22k Through Hole
22l Circular Arc Portion
22m First Portion
22n Second Portion
22q, 22s Opening
22o Bolt Hole
23, 25 Bolt
24 Connecting Member
12 Second Jig
26a Fixed Portion
26b First Side Wall Portion
26d Through Hole
26e Circular Arc Portion
26c Second Side Wall Portion
26f Through Hole
26g Circular Arc Portion
27 Rotation Shaft
13 Ratchet Mechanism
31 First Ratchet Tooth
31a Through Hole
31b Tooth Portion
31c Opening
32 Second Ratchet Tooth
32a Tooth Portion
33 Lever Pawl
33a Lever Main Body
33b Rotation Shaft
33c Fixing Jig
33d Pawl Portion
33e Knob Portion
34 Biasing Member
35 Holding Plate
36 Cover
36a Opening
14 Biasing Member
15 Fixing Unit
41 First Through Hole
42 Second Through Hole
43 Bolt
44 Plate Nut
45 Fall Prevention Tool
46 Washer
47 Fixing Plate
48 Bolt
51 First Regulating Portion
53 Pin
54 Regulating Groove
52 Second Regulating Portion
55 Pin
56 Regulating Groove
61 Display Unit
62 Scale Portion
63 Value Indicating Portion
71 Marking Portion
72 Visually Recognizing Portion
81, 82 Adapter

The invention claimed is:

1. A fixing device comprising:
a first jig configured to fix communication equipment;
a second jig configured to rotatably support the first jig about a rotation shaft;
a ratchet mechanism configured to be capable of switching restraint or permission of rotation of the first jig in one direction with respect to the second jig, on which the first jig intends to rotate with respect to the second jig due to weight of the communication equipment, and permit rotation of the first jig in another direction with respect to the second jig; and a first biasing member configured to store biasing force when the first jig rotates in the one direction with respect to the second jig due to weight of the communication equipment, and bias rotation of the first jig in another direction with respect to the second jig, wherein, a fixing unit configured to fix a rotation angle of the first jig with respect to the second jig is further included, the fixing unit includes:

a plurality of first through holes being formed on one of the first jig and the second jig on a circular arc having a first radius centered on the rotation shaft;

a second through hole being formed on another one of the first jig and the second jig on a circular arc having the first radius centered on the rotation shaft; and a fastener being passed through each one of the first through holes and the second through hole.

2. The fixing device according to claim 1, wherein the second through hole is arranged inside the fixing device with respect to the first through hole, another of the first jig and the second jig is provided with a marking portion configured to indicate a position of the second through hole, and one of the first jig and the second jig is provided with a visually recognizing portion configured to overlap with the marking portion and enable the marking portion to be visually recognized when the first through hole and the second through hole are arranged in such a way that the fastener can be passed mutually therethrough.

3. The fixing device according to claim 1, wherein the fastener is a bolt, and a head of the bolt is arranged outside the fixing device.

4. The fixing device according to claim 1, wherein the fastener is connected to one of the first jig and the second jig via a fall prevention tool.

5. The fixing device according to claim 1, further comprising a display unit configured to display a rotation angle of the first jig with respect to the second jig.

6. The fixing device according to claim 1, further comprising a regulating portion configured to regulate a rotation range of the first jig with respect to the second jig.

7. A communication device comprising:

the fixing device according to claim 1; and communication equipment configured to be fixed to the fixing device.

8. A fixing device comprising:

a first jig configured to fix communication equipment;

a second jig configured to rotatably support the first jig about a rotation shaft;

a ratchet mechanism configured to be capable of switching restraint or permission of rotation of the first jig in one direction with respect to the second jig, on which the first jig intends to rotate with respect to the second jig due to weight of the communication equipment, and permit rotation of the first jig in another direction with respect to the second jig; and a first biasing member configured to store biasing force when the first jig rotates in the one direction with respect to the second jig due to weight of the communication equipment, and bias rotation of the first jig in another direction with respect to the second jig, wherein the ratchet mechanism includes a first ratchet tooth having a tooth portion being formed on an outer periphery, a second ratchet tooth having a tooth portion being formed on an outer periphery, a lever pawl configured to be rotatable in such a way as to switch between an engaged state and a non-engaged state with a tooth portion of the first ratchet tooth or the second ratchet tooth, and a second biasing member configured to bias the lever pawl toward a tooth portion of the first ratchet tooth or the second ratchet tooth, and a tooth portion of the first ratchet tooth and a tooth portion of the second ratchet tooth are arranged by shifting a phase with each other.

* * * * *